(12) United States Patent
Stevenson et al.

(10) Patent No.: US 8,828,109 B2
(45) Date of Patent: Sep. 9, 2014

(54) METHOD AND APPARATUS FOR ASSEMBLING INJECTION DEVICES

(75) Inventors: John Saunders Stevenson, Yorba Linda, CA (US); John Duckett Winter, Broomfield, CO (US); Constantin Bugescu, La Habra Heights, CA (US); Kenneth M. Sprouse, Northridge, CA (US); David R. Matthews, Simi Valley, CA (US)

(73) Assignee: General Electric Company, Schenectady, NY (US)

( * ) Notice: Subject to any disclaimer, the term of this patent is extended or adjusted under 35 U.S.C. 154(b) by 912 days.

(21) Appl. No.: 12/854,688

(22) Filed: Aug. 11, 2010

(65) Prior Publication Data

US 2012/0036776 A1 Feb. 16, 2012

(51) Int. Cl.
*C10J 3/46* (2006.01)

(52) U.S. Cl.
USPC .......... 48/197 R; 48/61; 48/76; 48/89; 48/71; 48/72; 48/73; 48/77; 48/127.1; 48/127.9; 48/198.9; 48/200; 48/201; 48/202; 48/203; 111/260; 111/346; 111/265

(58) Field of Classification Search
USPC ................... 48/61, 76, 89; 110/346, 265, 260
See application file for complete search history.

(56) References Cited

U.S. PATENT DOCUMENTS

| 4,618,323 | A | 10/1986 | Mansour |
| 4,685,404 | A | 8/1987 | Sheppard et al. |
| 5,643,394 | A | 7/1997 | Maydan et al. |
| 5,813,846 | A | 9/1998 | Newby et al. |
| 5,823,122 | A | 10/1998 | Chronowski et al. |
| 5,947,716 | A | 9/1999 | Bellamy et al. |
| 6,276,611 | B1 * | 8/2001 | Brooker et al. ............... 239/5 |
| 6,609,905 | B2 | 8/2003 | Eroglu et al. |
| 6,679,049 | B2 | 1/2004 | Kline et al. |
| 6,807,804 | B2 | 10/2004 | Kline et al. |
| 6,820,412 | B2 | 11/2004 | Kline et al. |
| 8,685,120 | B2 * | 4/2014 | Sprouse et al. ............... 48/61 |
| 2004/0067461 | A1 | 4/2004 | Ranke et al. |
| 2006/0147853 | A1 | 7/2006 | Lipp et al. |
| 2006/0242907 | A1 | 11/2006 | Sprouse et al. |

(Continued)

FOREIGN PATENT DOCUMENTS

| CN | 1261910 A | 8/2000 |
| CN | 101097061 A | 1/2008 |
| KR | 100412158 B1 | 12/2003 |

OTHER PUBLICATIONS

FCCU Feed Injector Cold Flow Modeling 90EN194/91017, Texaco CE&P Engineering Division, 5 pages.

(Continued)

*Primary Examiner* — Kaity Handal
(74) *Attorney, Agent, or Firm* — Armstrong Teasdale LLP

(57) ABSTRACT

A method of assembling a gasification reactor includes extending an injection device at least partially into the gasification reactor. The injection device includes a plurality of substantially concentric conduits coupled to a modular tip and at least one outer surface. The modular tip includes a plurality of cooling channels and a plurality of substantially annular nozzles defined therein. The method further includes forming at least one layer of insulation about at least a portion of the at least one outer surface to facilitate insulating at least a portion of the injection device from heat within the gasification reactor.

20 Claims, 16 Drawing Sheets

(56) References Cited

U.S. PATENT DOCUMENTS

2009/0061370 A1* 3/2009 Douglas .................. 431/131
2010/0170253 A1   7/2010 Berry et al.
2012/0036775 A1* 2/2012 Sprouse et al. ................ 48/89
2012/0039761 A1* 2/2012 Sprouse et al. ............. 422/200

OTHER PUBLICATIONS

3 Stream Injector Cold Flow Modeling Results, ChevronTexaco, Feb. 12, 2004, 5 pages.

Duane Brooker, et al., Feed Injector Nozzle Scale-Up Testing: Bete Fog Nozzle Inc., Apr. 4-16, 1994, 73 pages.

National Aeronautics and Space Adminstration, Liquid Rocket Engine Injectors, NASA Space Vehicle Design Criteria (Chemical Propulsion), Mar. 1976, 131 pages, NASA SP-8089, National Technical Information Services, Springfield, Virginia.

Chinese Office Action, Application No. 201110238801.8, dated Jan. 8, 2014, pp. 8.

* cited by examiner

METHOD AND APPARATUS FOR ASSEMBLING INJECTION DEVICES

BACKGROUND OF THE INVENTION

The present invention relates generally to gasification systems, such as gasification systems used in an integrated gasification combined-cycle (IGCC) power generation plant, and more particularly, to methods and apparatus for insulating heat from external surfaces of gasification systems' injection devices.

Most known IGCC plants include a gasification system that is integrated with at least one power-producing turbine system. For example, at least some known gasification systems convert a mixture of fuel, air or oxygen, steam, and/or $CO_2$ into a synthetic gas, or "syngas." The syngas is channeled to the combustor of a gas turbine engine, which powers an electrical generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems include an injection system that supplies a gasification reactor with process fluids to facilitate at least one exothermic reaction. The injection system may include at least one injection device that is partially exposed to such exothermic reactions and the associated high temperatures. Such high temperatures may reduce the useful life span of some of the components within the injection devices.

BRIEF DESCRIPTION OF THE INVENTION

In one aspect, a method of assembling a gasification reactor includes extending an injection device at least partially into the gasification reactor. The injection device includes a plurality of substantially concentric conduits coupled to a modular tip and at least one outer surface. The modular tip includes a plurality of cooling channels and a plurality of substantially annular nozzles defined therein. The method further includes forming at least one layer of insulation about at least a portion of the outer surface to facilitate insulating at least a portion of the injection device from heat within the gasification reactor.

In another aspect, an injection device is provided. The injection device includes a plurality of substantially concentric conduits coupled to a modular tip that includes a plurality of substantially annular nozzles. The injection device also includes at least one outer surface extending into a gasification reactor such that the at least one outer surface is exposed to a source of heat within the gasification reactor. The injection device further includes at least one layer of insulation formed about at least a portion of the at least one outer surface to facilitate heat insulation from the heat within the gasification reactor.

In yet another aspect, a gasification facility is provided. The gasification facility includes at least one carbonaceous reactant source and at least one oxygenated fluid reactant source. The gasification facility also includes at least one gasification reactor including at least one injection device coupled in flow communication with the at least one carbonaceous reactant source and the at least one oxygenated fluid reactant source. The at least one injection device includes a plurality of substantially concentric conduits coupled to a modular tip that includes a plurality of substantially annular nozzles. The at least one injection device also includes at least one outer surface extending into the at least one gasification reactor such that the at least one outer surface is exposed to a source of heat within the at least one gasification reactor. The at least one injection device further includes at least one layer of insulation formed about at least a portion of the at least one outer surface to facilitate heat insulation from the heat within the at least one gasification reactor.

DETAILED DESCRIPTION OF THE INVENTION

Figure 1:
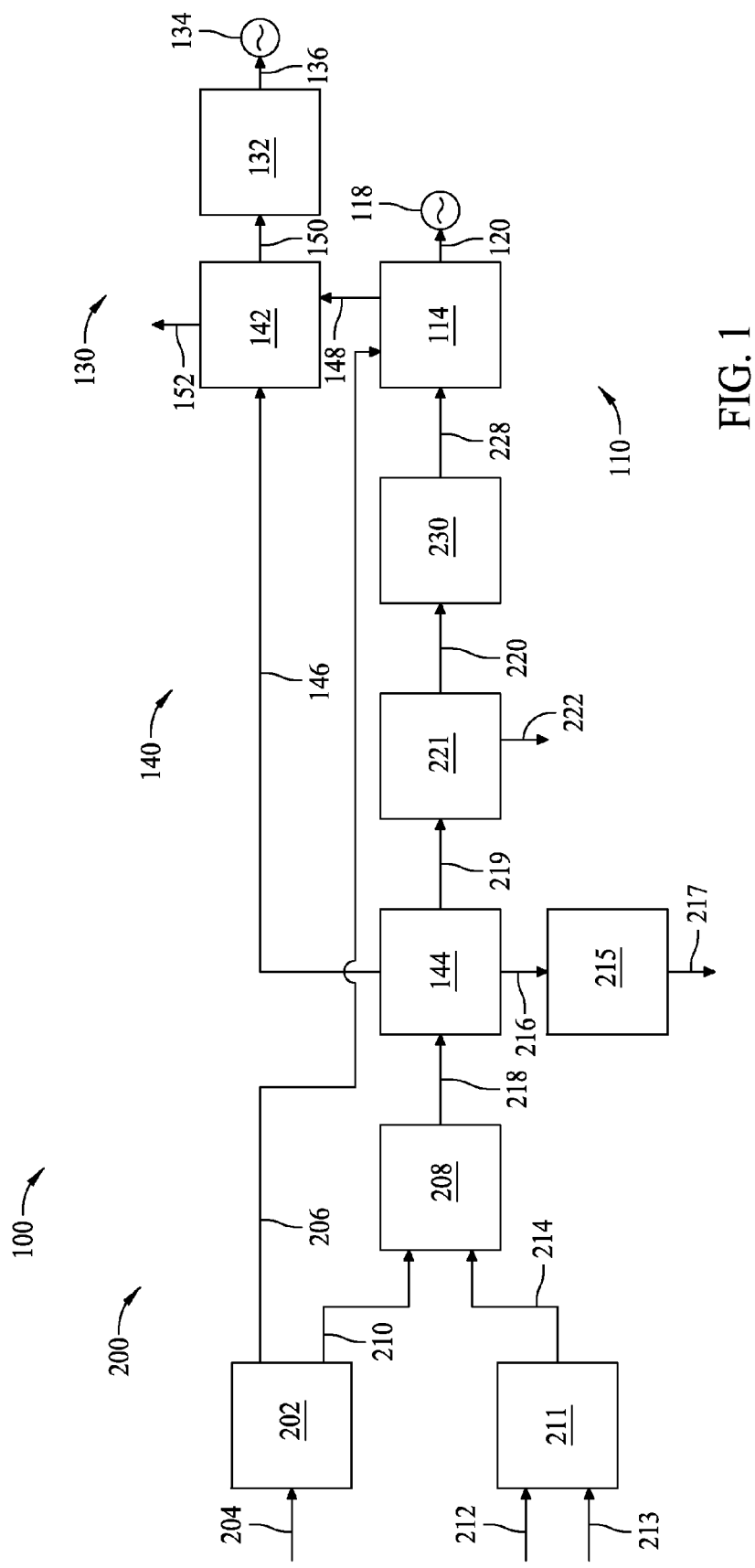
FIG. 1 is a schematic diagram of an exemplary gasification facility.

FIG. 1 is a schematic diagram of an exemplary facility that uses an injection system, specifically, a gasification facility, and more specifically, an exemplary integrated gasification combined-cycle (IGCC) power generation plant 100. Alternatively, the method and apparatus to produce synthetic gas as described herein is used with any facility in any suitable configuration that that enables such method and apparatus including, but not limited to, any combustion facilities, chemical processing facilities, and food processing facilities.

In the exemplary embodiment, IGCC plant 100 includes a gas turbine engine 110. A turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source (neither shown in FIG. 1), respectively. Turbine 114 mixes air and fuel, produces hot combustion gases (not shown), and converts the heat energy within the gases to rotational energy. The rotational energy is transmitted to generator 118 via rotor 120, wherein generator 118 converts the rotational energy to electrical energy (not shown) for transmission to at least one load, including, but not limited to, an electrical power grid (not shown).

IGCC plant 100 also includes a steam turbine engine 130. In the exemplary embodiment, engine 130 includes a steam turbine 132 rotatably coupled to a second electrical generator 134 via a second rotor 136.

IGCC plant 100 further includes a steam generation system 140. In the exemplary embodiment, system 140 includes at least one heat recovery steam generator (HRSG) 142 that receives exhaust gases (not shown) from turbine 114 via an exhaust gas conduit 148 that supplies heat used within HRSG 142 to produce one or more streams of steam from at least one boiler feedwater source that includes, but is not limited to, at least one heated boiler feedwater stream (not shown). HRSG 142 also is coupled in flow communication with at least one heat transfer apparatus 144 via at least one steam conduit 146. Apparatus 144 is also coupled in flow communication with at least one heated boiler feedwater conduit (not shown), wherein apparatus 144 receives heated boiler feedwater (not shown) from the same or a separate boiler feedwater source (not shown). HRSG 142 receives steam (not shown) from apparatus 144 via conduit 146, wherein HRSG 142 facilitates addition of heat energy to the steam. HRSG 142 is coupled in flow communication with turbine 132 via a steam conduit 150. In the exemplary embodiment, the cooled combustion gases are exhausted from HRSG 142 to the atmosphere via stack gas conduit 152. Alternatively, at least a portion of the excess combustion gases from HRSG 142 are channeled for use elsewhere in IGCC plant 100.

Conduit 150 is configured to channel steam (not shown) from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown). Alternatively, at least a portion of the steam from HRSG 142, steam turbine 132 and/or heat transfer apparatus 144 is channeled for use elsewhere in IGCC plant 100.

IGCC plant 100 also includes a gasification system 200. In the exemplary embodiment, system 200 includes at least one air separation unit 202 coupled in flow communication with an air source via an air conduit 204. The air sources include, but are not limited to, dedicated air compressors (not shown) and a compressor (not shown) typically associated with gas turbine engine 110. Unit 202 is configured to separate air into one or more streams of oxygen ($O_2$), nitrogen ($N_2$) and other component streams (neither shown). The other component streams may be released via a vent (not shown) or collected in a storage unit (not shown). In the exemplary embodiment, at least a portion of $N_2$ is channeled to gas turbine 114 via a $N_2$ conduit to facilitate combustion.

System 200 includes a gasification reactor 208 that is coupled in flow communication with unit 202 and is configured to receive the $O_2$ channeled from unit 202 via an $O_2$ conduit 210. System 200 also includes a material grinding and slurrying unit 211. Unit 211 is coupled in flow communication with a carbonaceous material source and a water source (neither shown) via a carbonaceous material supply conduit 212 and a water supply conduit 213, respectively. In the exemplary embodiment, the carbonaceous material is petroleum coke, or pet coke. Moreover, in the exemplary embodiment, Unit 211 is configured to mix the pet coke and water to form a pet coke slurry stream (not shown) that is channeled to reactor 208 via a pet coke slurry conduit 214. Alternatively, any material that includes carbonaceous solids is used that facilitates operation of IGCC plant 100 as described herein. Also, alternatively, non-slurry fuels that include solid, liquid and gaseous fuel substances are used, including mixtures of fuels and other materials, such as but not limited to, fuel and slag additives.

Reactor 208 is configured to receive the material slurry stream and an $O_2$ stream via conduits 214 and 210, respectively. Reactor 208 is also configured to facilitate production of a hot, raw synthetic gas (syngas) stream (not shown). Moreover, reactor 208 is also configured to produce hot slag and char (both not shown) as a by-product of the syngas production.

Reactor 208 is coupled in flow communication with heat transfer apparatus 144 via a hot syngas conduit 218. Apparatus 144 is configured to receive the hot, raw syngas stream and transfer at least a portion of the heat to HRSG 142 via conduit 146. Subsequently, apparatus 144 produces a cooled, raw syngas stream (not shown) that is channeled to a scrubber and low temperature gas cooling (LTGC) unit 221 via a syngas conduit 219. Unit 221 is configured to remove the portion of slag and char entrained within the raw syngas stream (sometimes referred to as "fines") and facilitate removal of the fines via a fines conduit 222. The fines are sent to a waste collection system (not shown) for ultimate disposal and/or recirculated back into gasification reactor 208 to take advantage of unused carbon content within the fines. Unit 221 is also configured to further cool the raw syngas stream.

Apparatus 144 also facilitates removal of slag and char from the hot, raw syngas stream. Specifically, a slag and char handling unit 215 is coupled in flow communication with apparatus 144 via a hot slag conduit 216. Unit 215 is configured to quench the balance of the char and slag, simultaneously breaking up the slag into small pieces wherein a slag and char removal stream (not shown) is produced and channeled through conduit 217. In a manner similar to the fines discussed above, the slag and char are channeled to a waste collection subsystem (not shown) for ultimate disposal and/or recirculated back into gasification reactor 208 to take advantage of unused carbon within the slag and char.

System 200 further includes an acid gas removal subsystem 230 that is coupled in flow communication with unit 221 and is configured to receive the cooled raw syngas stream via a raw syngas conduit 220. Subsystem 230 is also configured to facilitate removal of at least a portion of acid components (not shown) from the raw syngas stream as discussed further below. Such acid gas components include, but are not limited to, $H_2S$ and $CO_2$. Subsystem 230 is further configured to facilitate separation of at least some of the acid gas components into components that include, but are not limited to, $H_2S$ and $CO_2$. In the exemplary embodiment, $CO_2$ is not recycled and/or sequestered. Alternatively, subsystem 230 is coupled in flow communication with reactor 208 via at least one $CO_2$ conduit (not shown) wherein a stream of $CO_2$ (not shown) is channeled to predetermined portions of reactor 208. The removal of such $CO_2$ and $H_2S$ via subsystem 230 facilitates producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented or collected, wherein at least a portion of $N_2$ is channeled to turbine 114 via a conduit 206 and at least a portion of $O_2$ is channeled to gasification reactor 208 via conduit 210. Remaining portions of $N_2$ and $O_2$ may be channeled as a plurality of streams to other portions of IGCC 100 as needed, including, but not limited to, storage. Also, in operation, material grinding and slurrying unit 211 receives pet coke and water via conduits 212 and 213, respectively, forms a pet coke slurry stream and channels the pet coke slurry stream to reactor 208 via conduit 214.

Reactor 208 receives the $O_2$ via conduit 210, pet coke via conduit 214. Reactor 208 facilitates production of a hot raw syngas stream that is channeled to apparatus 144 via conduit 218. Some of the slag by-product that is formed in reactor 208 is removed via slag handling unit 215 and conduits 216 and 217. Apparatus 144 facilitates cooling the hot raw syngas stream to produce a cooled raw syngas stream that is channeled to scrubber and LTGC unit 221 via conduit 219 and the syngas is cooled further. Particulate matter, including some of the slag and char (in the form of fines), is removed from the syngas via conduit 222. The cool raw syngas stream is channeled to acid gas removal subsystem 230 wherein acid gas components are selectively removed such that a clean syngas stream is formed and channeled to gas turbine 114 via conduit 228.

Further, in operation, turbine 114 receives $N_2$ and clean syngas via conduits 206 and 228, respectively. Turbine 114 compresses air from at least one air source (not shown) that turbine 114 subsequently mixes and combusts with the syngas fuel, producing hot combustion gases. Turbine 114 channels the hot combustion gases to induce rotation of turbine 114 which subsequently rotates first generator 118 via rotor 120. At least a portion of the exhaust gases are channeled to HRSG 142 from turbine 114 via an exhaust gas conduit 148 to facilitate generating steam.

At least a portion of the heat removed from the hot syngas via heat transfer apparatus 144 is channeled to HRSG 142 as steam via conduit 146. HRSG 142 receives the steam from apparatus 144, together with one or more streams of boiler feed water, as well as the exhaust gases from turbine 114. Heat is transferred from the exhaust gases to the one or more streams of boiler feedwater as well as the steam from apparatus 144, thereby producing one or more subsequent streams of steam as well as increasing the heat energy contained in the steam from apparatus 144. In the exemplary embodiment, at least one of the streams of steam generated as described above is heated to superheated conditions. Alternatively, one or more of the aforementioned streams of steam are mixed together to form one or more mixed streams that may be heated to superheated conditions. Alternatively, high temperature saturated steam is formed. At least a portion of the superheated steam is channeled to steam turbine 132 via conduit 150 and induces a rotation of turbine 132. Turbine 132 rotates second generator 134 via second rotor 136. A remaining portion of the steam is channeled for use elsewhere within IGCC plant 100.

Figure 2:
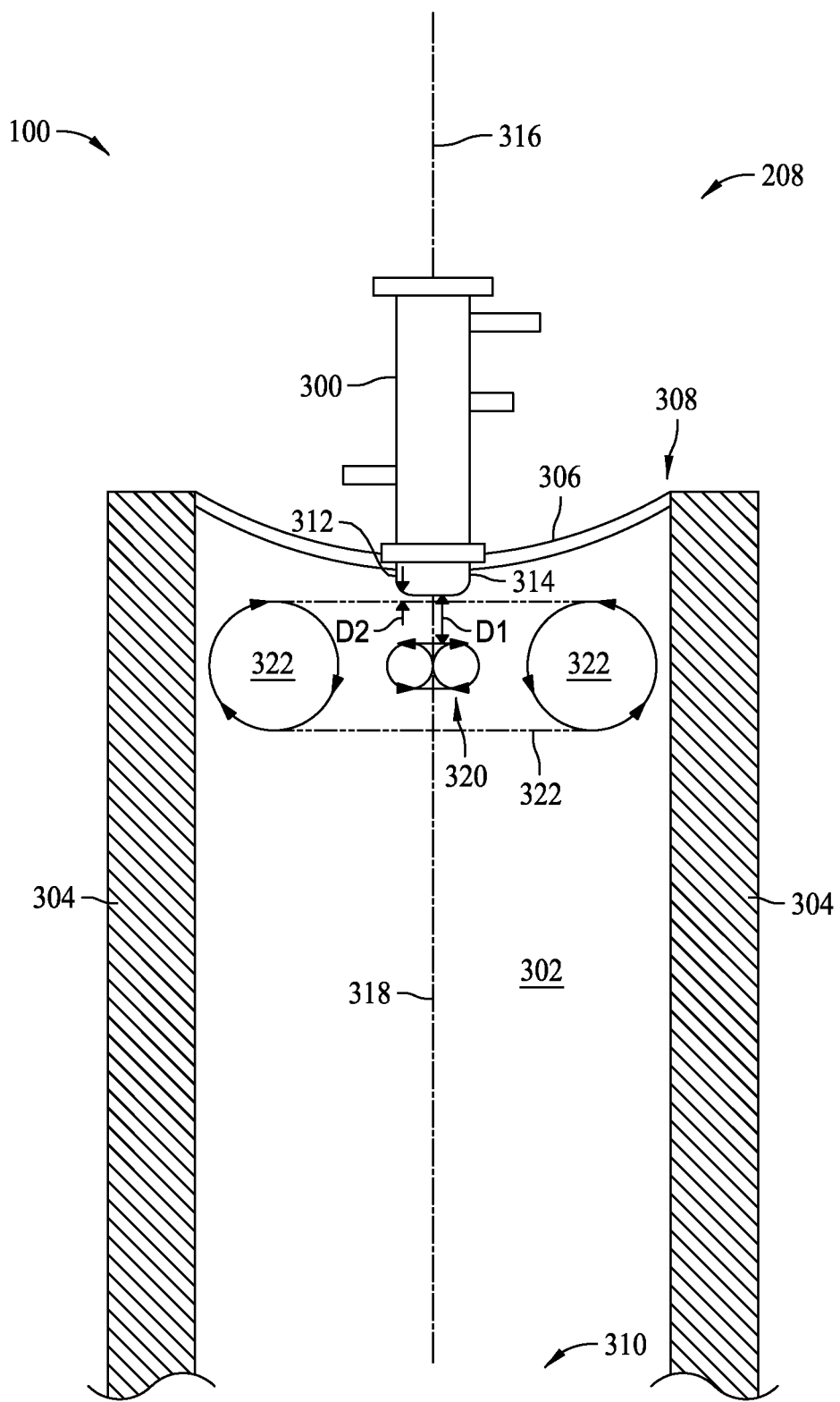
FIG. 2 is a schematic cross-sectional view of a gasification reactor that may be used for synthetic gas generation, such as may be used with the gasification facility shown in FIG. 1.

FIG. 2 is a schematic cross-sectional view of gasification reactor 208 that may be used for synthetic gas generation, such as may be used with IGCC power generation plant 100. Reactor 208 includes at least one injection device 300 that is coupled in flow communication with a gasification cavity 302. In the exemplary embodiment, device 300 is an annular triplet gasifier injector nozzle as described herein, thereby including three annular passages (described further below). Alternatively, device 300 is any suitable injector nozzle that includes, but is not limited to, configurations with four or more annular passages. Further, alternatively, device 300 is any suitable injector nozzle that includes, but is not limited to, three or more concentric passages, wherein each passage is coupled in flow communication with the annular passages described above in any suitable configuration that facilitates operation of injection device 300 as described herein.

Cavity 302 is at least partially defined by a substantially cylindrical reactor wall 304 and a head end cover 306. In the exemplary embodiment, gasification reactor 208 is substantially cylindrical. Alternatively, reactor 208 includes any configuration that facilitates operation of reactor 208 as described herein. Also, in the exemplary embodiment, device 300 has a substantially vertical orientation (described further below) wherein device 300 penetrates the top of reactor 208 and points substantially downward. Alternatively, device 300 has any orientation including, but not limited to, substantially horizontal orientations.

In the exemplary embodiment, wall 304 includes at least one ceramic refractory material that includes, but is not limited to, heat tempered bricks. Alternatively, wall 304 is fluid-cooled, wherein the cooling fluids include, but are not limited to water and/or steam. Cover 306 is sealingly coupled to at least a portion of a head end portion 308 of reactor 208. Cavity 302 is also partially defined by a tail end cover (not shown) that is sealingly coupled to at least a portion of wall 304, wherein the tail end cover is positioned on a tail end portion 310 that is in opposition to portion 308. Alternatively, cover 306, head end portion 308, the tail end cover and tail end portion 310 are oriented in any suitable position relative to wall 304, including any orientation that facilitates operation of reactor 208 as described herein. Furthermore, wall 304 may be of any configuration that facilitates operation of reactor 208 as described herein. Moreover, alternatively, reactor 208 has any suitable configuration that facilitates operation of IGCC 100 as described herein.

Injector device 300 includes a tip portion 312 that is inserted through an aperture 314 defined in head end cover 306 and sealingly coupled to head end cover 306 using a fastening method that includes, but is not limited to, retention hardware (not shown). Reactor 208 is configured such that an axial centerline 316 of injector device 300 is collinear with a longitudinal centerline 318 of gasification cavity 302. Tip portion 312 is configured to form a plurality of recirculation zones within cavity 302. Specifically, tip portion 312 is configured to form a first recirculation zone 320 a first distance $D_1$ from tip portion 312 within gasification cavity 302. Recirculation zone 320 has a shape that is substantially toroidal and the shape is one of substantially spatially continuous or partially segmented. Moreover, recirculation zone 320 is positioned close to and, with respect to centerline 318, substantially centered about centerline 318. Also, specifically, tip portion 312 is configured to form a second recirculation zone 322 a second distance $D_2$ from tip portion 312 within gasification cavity 302. Recirculation zone 322 has a shape that is substantially toroidal and the shape is one of substantially spatially continuous or partially segmented. Moreover, recirculation zone 322 is positioned with respect to centerline 318, that is, substantially centered about centerline 318, and in close proximity to wall 304. First recirculation zone 320 is proximately centered within second recirculation zone 322.

Alternative embodiments of reactor 208 may include a plurality of injection devices 300, wherein each device 300 has a centerline 316, such that each associated centerline 316 is co-linear with a predefined axial orientation similar to centerline 318. Each of such plurality of devices 300 may have either a vertical, i.e., directly upward and/or directly downward, and/or a horizontal orientation, including any orientation between purely vertical and purely horizontal orientations, that facilitates operation of reactor 208 as described herein. Furthermore, such alternative embodiments of reactor 208 may include a plurality of devices 300, wherein all of devices 300 have a substantially similar orientation. Moreover, such alternative embodiments of reactor 208 may include a plurality of devices 300, wherein a first number of such injectors 300 have a differing orientation than a second number of such devices 300.

Still further alternative embodiments of reactor 208 may include a plurality of devices 300 wherein devices 300 are distributed across one or more surfaces of reactor 208, each device 300 with a differing orientation. Moreover, injectors 300 making up at least a portion of plurality of injectors 300 may each be placed in a dedicated cavity (not shown) that is a part of, or otherwise joined with, reactor 208, thereby facilitating separate formation or development of multiple recirculation zones from each such injector 300.

Figure 3:
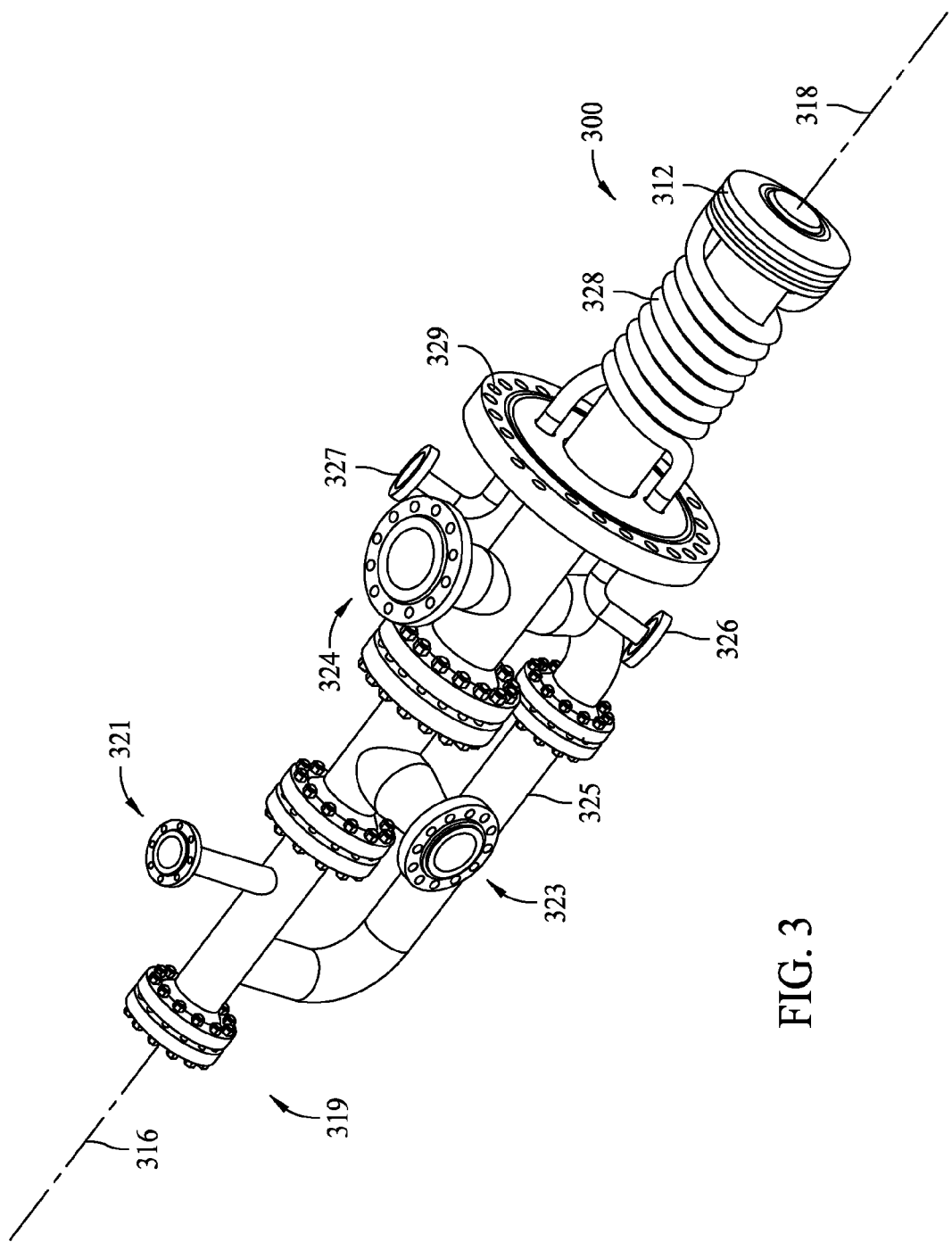
FIG. 3 is a schematic perspective view of an exemplary injector feed assembly that may be used with the gasification reactor shown in FIG. 2.

FIG. 3 is a schematic perspective view of an exemplary injector feed assembly 319 that may be used with gasification reactor 208 (shown in FIG. 2). Injection device axial centerline 316 and gasification cavity longitudinal centerline 318 are illustrated for perspective. In the exemplary embodiment, injector feed assembly 319 is a bayonet assembly. Specifically, assembly 319 includes a first bayonet section, that is, an inner oxygen ($O_2$) supply section 321 that is coupled in flow communication to an $O_2$ source similar to $O_2$ conduit 210 (shown in FIG. 1). Assembly 319 also includes a second bayonet section, that is, a middle slurry section 323 that is coupled in flow communication to a slurry source similar to material slurry conduit 214 (shown in FIG. 1). Assembly 319 further includes a third bayonet section, that is, an outer $O_2$ supply section 324 that is coupled in flow communication to an $O_2$ source similar to $O_2$ conduit 210. At least a portion of section 324 extends about at least a portion of section 323, at least a portion of section 323 extends about at least a portion of section 321, and, at least a portion of section 324 extends about at least a portion of section 321. Moreover, sections 321, 323, and 324 terminate where they join tip 312 in flow communication. Therefore, sections 321, 323 and 324 define a plurality of substantially concentric passages or channels, or, specifically, an inner $O_2$ channel, a middle slurry channel, and an outer $O_2$ channel (neither shown in FIG. 3) within assembly 319.

Assembly 319 also includes an $O_2$ bypass line 325 that establishes at least some flow communication between bayonet sections 324 and 321 such that a predetermined $O_2$ mass flow rate distribution is facilitated based at least partially upon cumulative predetermined $O_2$ pressure drops that occur as $O_2$ is channeled through bayonet sections 321 and 324, $O_2$ bypass line 325, and subsequent components as $O_2$ is discharged from assembly 319. Therefore, maintaining predetermined ratios of an outer $O_2$ mass flow rate and an inner $O_2$ mass flow rate (neither shown) are facilitated. Bypass line 325 facilitates installation and operation of assembly 319 in retrofits of gasification reactor 208. Alternatively, methods that include, but are not limited to flow orifices and manually-operated and automated throttle valves are used in conjunction with, or in lieu of, bypass line 325.

Assembly 319 further includes a cooling fluid inlet manifold 326 and a cooling fluid outlet manifold 327 coupled in flow communication with tip portion 312 of injection device 300 via a plurality of cooling fluid coils 328. Manifolds 326 and 327 and coils 328 facilitate channeling a cooling fluid to remove heat from tip portion 312 (discussed in more detail below). Assembly 319 also includes a mounting flange 329 that is removably and sealingly coupled to head end cover 306 using a fastening method that includes, but is not limited to, retention hardware (not shown). Alternatively, assembly 319 includes at least one cooling jacket with cooling fluid supply and return means integral with at least a portion of outer $O_2$ supply section 324 between mounting flange 329 and tip portion 312 that facilitates channeling of cooling fluid to remove heat from tip portion 312. Also, alternatively, assembly 319 has any number of coolant connections and/or coolant flow means that facilitate operation of injection device 300 as described herein.

Figure 4:
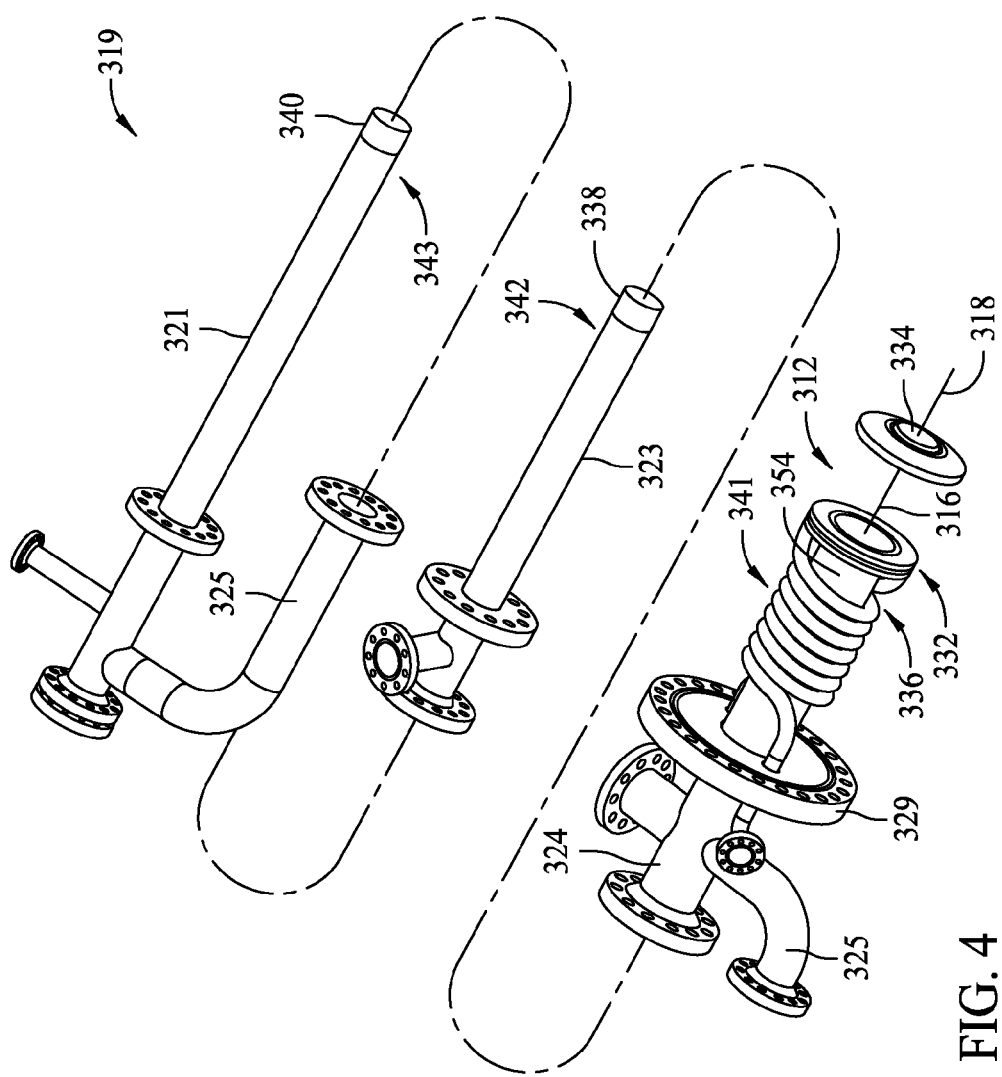
FIG. 4 is an exploded view of the exemplary injector feed assembly shown in FIG. 3.

FIG. 4 is an exploded view of the exemplary injector feed assembly 319. In the exemplary embodiment, inner oxygen supply section 321 is positioned at least partially within slurry supply section 323, which is at least partially positioned within outer oxygen supply section 324. Assembly 319 has a "bayonet" design, wherein sections 321, 323, and 324 hereon are also referred to as bayonets and/or bayonet sections 321, 323, and 324. Bayonet section 321 includes an end 343, bayonet section 323 includes an end 342, and bayonet section 321 includes an end 341.

Figure 5:
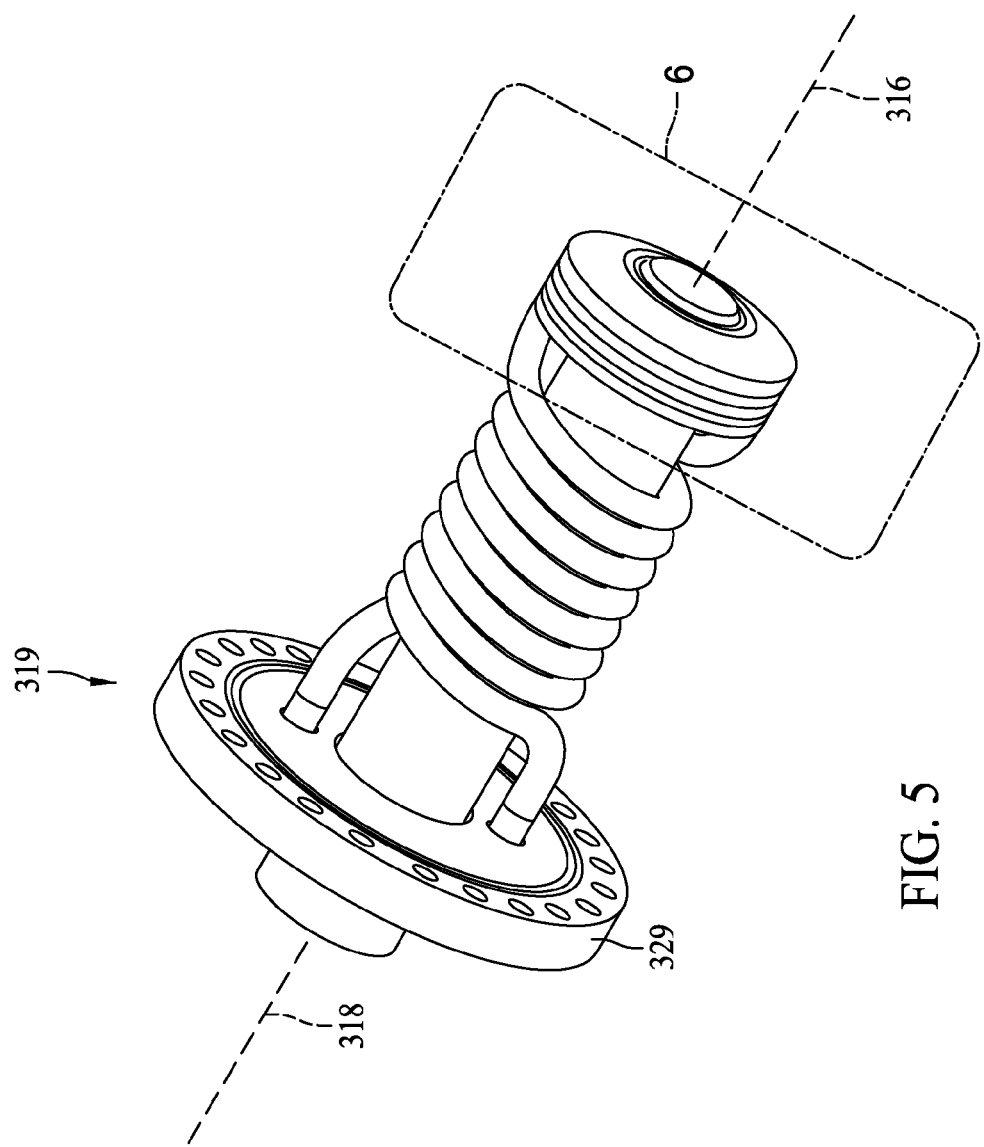
FIG. 5 is a schematic perspective view of a portion of the exemplary injector feed assembly shown in FIG. 3.
Figure 6:
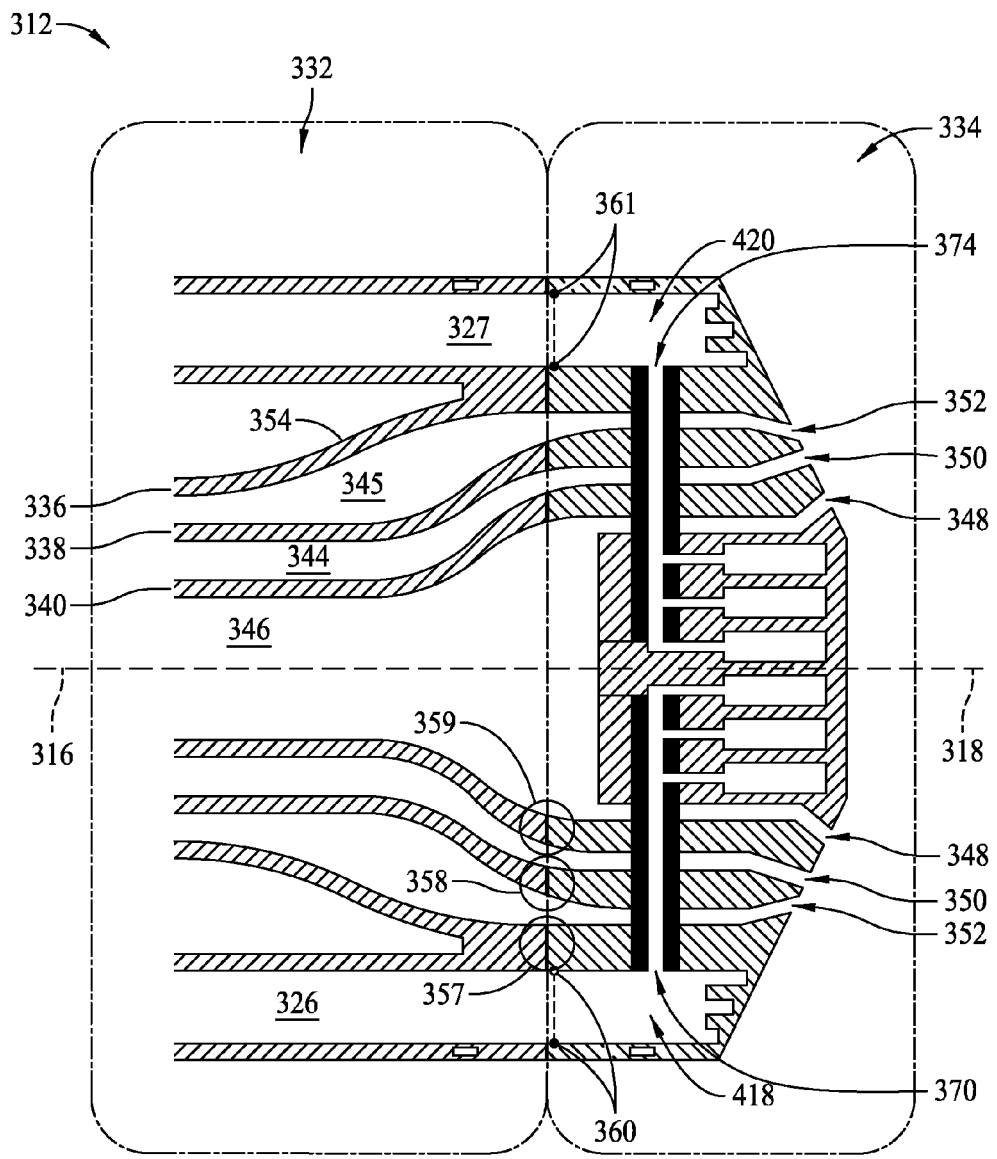
FIG. 6 is a schematic cross-sectional view of a tip portion of an injection device that may be used with the injector feed assembly of FIG. 5 taken along area 6.
Figure 7:
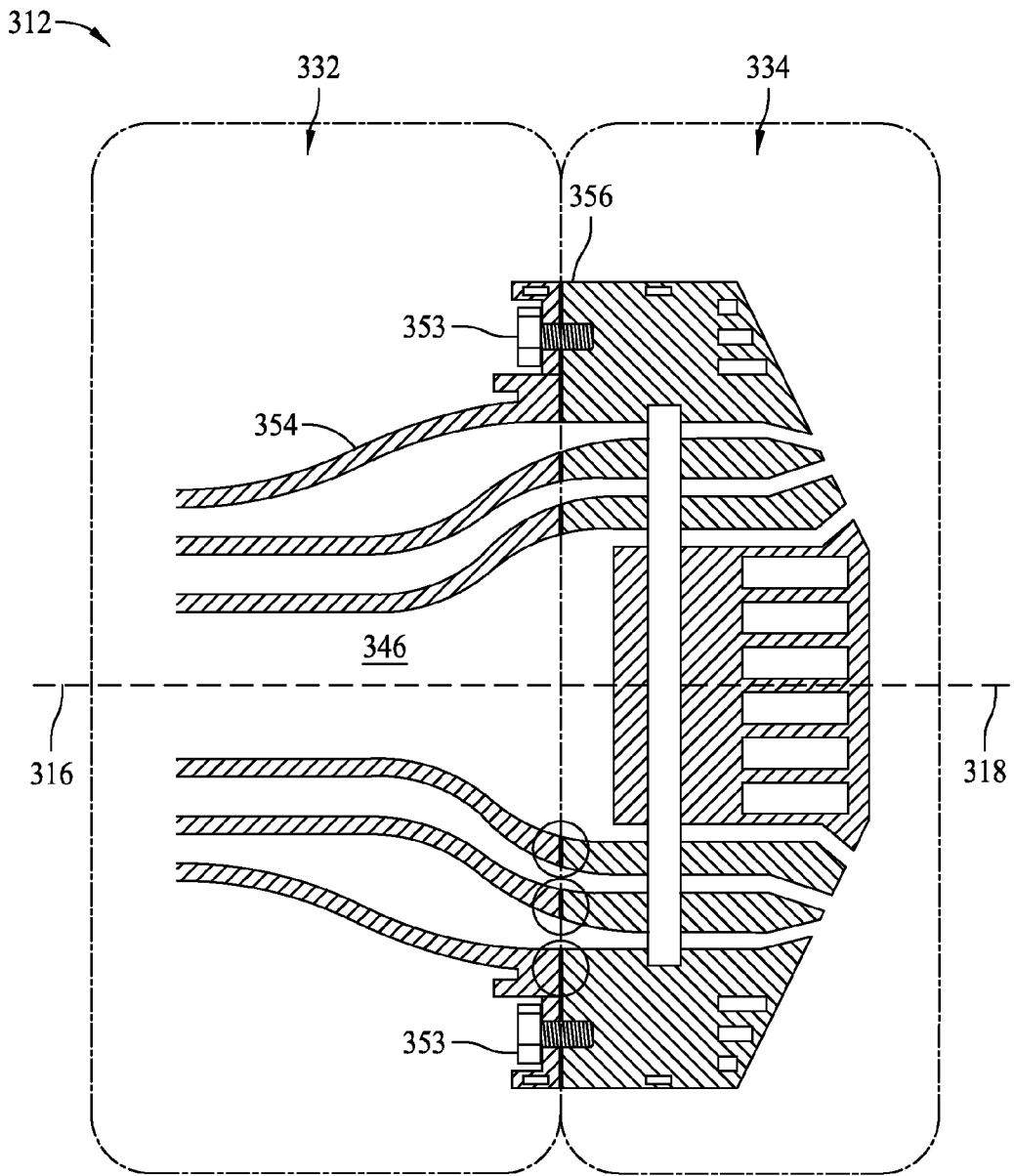
FIG. 7 is another schematic cross-sectional view of the exemplary tip portion shown in FIG. 6.

FIG. 5 is a schematic perspective view of a potion of injector feed assembly 319, including area 6. FIG. 6 is a schematic cross-sectional view of tip portion 312 of injector feed assembly 319 taken along area 6 (shown in FIG. 5). FIG. 7 is another schematic cross-sectional view of tip portion 312 that is oriented 90° about axial centerline 316 from the perspective shown in FIG. 6. Tip portion 312 controls the distribution of flow of reactant supply fluids between injector feed assembly 319 and gasification cavity 302 (shown in FIG. 2). FIG. 7 shows a support pin 498 and a coolant spoke 492 and/or 494, wherein pin 498 and spokes 492 and 494 are discussed further below after FIG. 10

Moreover, as illustrated in the exemplary embodiment, adapter portion 332 includes three substantially annular adapters: an outer gaseous oxygen (GOX) bayonet adapter 336, a slurry bayonet adapter 338, and an inner GOX bayonet adapter 340. Bayonet adapters 336, 338, and 340 are coupled in flow communication with bayonet sections 324, 323 and 321 (all shown in FIG. 3), respectively. More specifically, outer GOX bayonet adapter 336 is coupled to an end 341 of bayonet section 324 (both shown in FIG. 4). Slurry bayonet adapter 338 is coupled to an end 342 of bayonet section 323 (both shown in FIG. 4). Inner GOX bayonet adapter 340 is coupled to an end 343 of bayonet section 321 (both shown in FIG. 4).

In the exemplary embodiment, adapter portion 332 may be fabricated as a plurality of extensions of bayonet sections 321, 323, and 324 of assembly 319, rather than as a component or components of tip portion 312. That is, in the exemplary embodiment, outer GOX bayonet adapter 336, slurry bayonet adapter 338, and inner GOX bayonet adapter 340 are separate pieces that are individually coupled to bayonet sections 321, 323, and 324, respectively, during assembly of injector feed assembly 319. Alternatively, at least two of bayonet adapters 336, 338, and 340 are coupled together to form a single piece. That is, alternatively, tip portion 312 includes an integrated, unitarily-formed bayonet adapter portion 332 and a modular tip 334, wherein adaptor portion 332 is coupled to bayonet sections 321, 323, and 324 of assembly 319.

In the exemplary embodiment, slurry bayonet adapter 338 and inner GOX bayonet adapter 340 partially define a reactant, or slurry, channel 344. Slurry channel 344 is in flow communication with a middle coal slurry channel (not shown) defined and extending within assembly 319 (shown in FIG. 3). In the exemplary embodiment, slurry bayonet adapter 338 and outer GOX bayonet adapter 336 partially define an outer reactant channel, that is, an outer GOX channel 345, and inner GOX bayonet adaptor 340 partially defines an inner reactant channel, that is, an inner GOX channel 346. Inner GOX channel 346 and outer GOX channel 345 are coupled in flow communication with an inner and an outer oxygen channel (neither shown) defined and extending within assembly 319. Alternatively, either of channels 345 and 346 are oriented to channel any process fluid that facilitates operation of gasification reactor 208 including, but not limited to, steam, nitrogen and carbon dioxide, and channels 345 and 346 are coupled in flow communication with the appropriate fluid sources.

Adapter portion 332 is coupled to injector feed assembly 319 via known methods such as, but not limited to, welding, brazing, and/or retention hardware (not shown).

To form the first recirculation zone 320 and the second recirculation zone 322 (both shown in FIG. 2), tip portion 312 includes both diverging and converging nozzles. More specifically, a plurality of nozzles are formed within modular tip 334 including an inner GOX nozzle 348, a slurry nozzle 350, and an outer GOX nozzle 352. Inner GOX nozzle 348 and slurry nozzle 350 direct respective process fluids away from injector axial centerline 316, and are referred to as diverging nozzles. Outer GOX nozzle 352 directs a respective process fluid toward injector axial centerline 316, and is therefore referred to as a converging nozzle. Alternatively, outer GOX nozzle 352 is either a divergent nozzle or a parallel nozzle with respect to injector axial centerline 316.

Injection device 300, that includes injector feed assembly 319 with tip portion 312 having both diverging and converging nozzles including nozzles 348, 350, and 352, facilitates mixing of the reactant streams, that is, the slurry and GOX streams (neither shown) at predetermined angles with predetermined momentums. Nozzles 348, 350, and 352 also facilitate improving an efficiency of chemical reactions between the slurry and oxygen.

Orienting and configuring nozzles 348, 350, and 352 as discussed herein has beneficial results that include, but are not limited to, facilitating vaporization of the reactants. Specifically, forming recirculation zones 320 and 322 facilitates increasing a residence time of the slurry and GOX such that exothermic reactions between the carbonaceous material and GOX occur more effectively. Moreover, an additional benefit of forming such recirculation zones 320 and 322 in the vicinity of head end portion 308 (shown in FIG. 2) facilitates increasing heat release in that vicinity, and therefore facilitates vaporization of water in the slurry stream. However, due to localized exothermic reactions and associated heat releases, portions of injection device 300, that is, at least one outer surface of injection device 300, is exposed to hot syngas (not shown) including, but not limited to, a radially inner external surface 354 (also shown in FIG. 4) of tip portion 312 and a radially outer external surface 356 of tip portion 312. Such high temperature exposures are discussed further below.

In general, initial assembly of, as well as post-commissioning field service and maintenance disassembly and reassembly of known injector assemblies are each complicated by including both diverging and converging nozzles within such injector assemblies. For example, in most cases, it is difficult to remove a known bayonet having a diverging tip that at least partially forms a diverging nozzle from a next larger known bayonet if the larger bayonet has a converging tip with a converging nozzle that is similar to, or smaller in size than the diverging tip, since such converging tip may interfere with axial removal of such diverging tip. Therefore, partial disassembly of tip portion 312 by disassembly of divergent nozzles 348 and 350 from convergent nozzle 352 is especially difficult. One method of disassembly where such interferences occur between the nozzles in the injector includes removing the injector (that is, injector 300 as described herein) from the reactor cavity (that is, cavity 302 as described herein and shown in FIG. 2), and cutting off the tips of the known bayonets.

However, in the exemplary embodiment, modular tip 334 simplifies assembly, disassembly, and field service of injection device 300 while facilitating the use of a combination of diverging and converging nozzles 348, 350, and 352. This simplification is achieved since the converging and diverging nozzles 348, 350, and 352 are formed within modular tip 334, which is releasably coupled to adapter portion 332. Bayonet adapters 336, 338, and 340 are sized such that each adapter and respective bayonet can be removed from the next larger adapter and respective bayonet when modular tip 334 is not coupled to adapter portion 332.

In the exemplary embodiment, modular tip 334 is fabricated as a single component from a plurality of individual components that are joined together by known coupling methods including, for example, brazing or welding. Alternatively, one-piece modular tip 334 may be formed by methods that include direct metal laser sintering. One-piece modular tip 334 is coupled in flow communication with adapter portion 332. Modular tip 334 may be fabricated as one-piece to achieve a desired degree of nozzle precision and also to ease field assembly and disassembly. Also, in the exemplary embodiment, modular tip 334 is removably coupled to adapter portion 332 via known coupling methods that include, but are not limited to, retention hardware 353 (discussed further below). Alternatively, modular tip 334 is removably coupled to adapter portion 332 via any known coupling methods that enable operation of modular tip 334 as described herein. Retention hardware 353 and external surface 354 are proximate to each other.

Further, in the exemplary embodiment, tip portion 312, which includes modular tip 334 and adaptor portion 332 removably coupled together via retention hardware 353 rather than welded together, also includes a plurality of seals that are used to maintain separation between slurry channel 344, outer GOX channel 345, inner GOX channel 346, cooling water manifold 326, cooling water manifold 327, and a flow of hot syngas (not shown) within cavity 302 that is external to injector feed assembly 319. More specifically, in the exemplary embodiment, a seal assembly 357 maintains a separation between outer GOX channel 345 and the syngas contacting external surface 354. Moreover, a seal assembly 358 maintains a separation between outer GOX channel 345 and slurry channel 344. In addition, a seal assembly 359 maintains a separation between slurry channel 344 and inner GOX channel 346. Furthermore, a seal assembly 360 facilitates maintaining a separation between cooling fluid inlet manifold 326, outer GOX channel 345, and hot syngas that contacts external surface 354. Still further, a seal assembly 361 facilitates maintaining separation between cooling fluid outlet manifold 327, outer GOX channel 345, and hot syngas that contacts external surface 354. Seal assemblies 357, 358, 359, 360, and 361 are manufactured from any materials in any configuration that enables operation of modular tip 334 as described herein including, without limitation, metallic seals, o-rings, singular or redundant seals, and any combination thereof.

Each of seal assemblies 357, 358, 359, 360, and 361 facilitates preventing unintended mixing of the process fluids and coolants used in the gasification process while utilizing an injector tip that includes multiple components that are not connected together by welding or brazing. Specifically, during assembly of tip portion 312 that includes coupling adapter portion 332 to modular tip 334, the shapes of the mating surfaces of adaptor portions 332, 338 and 340 and tip 322, seal assemblies 360 and 361 facilitate alignment and attainment of predetermined gaps between portions 332, 338 and 340 and tip 334 to attain a predetermined gap (not shown) therebetween to further facilitate secure coupling of portions 332, 338 and 340 with tip 334. This is at least partially due to seal assemblies 360 and 361 having smaller diameters than seal assemblies 357, 358, and 359, thereby seal assemblies 360 and 361 are more likely to attain a full circumferential crush thereon. Also, specifically, seal assemblies 357, 358, and 359 facilitate providing a greater tolerance range within tip 334 to facilitate a greater tolerance for variances due to fabrication and assembly, and shifting and movement of components therein. Alternatively, one of seals 357, 358 or 359 may be used to facilitate the alignment and attainment of predetermined gaps between portions 332, 338 and 340 with tip 334. Further alternatively, any means known to those familiar with the art may be used to facilitate alignment and attainment of predetermined gaps between portions 332, 338, and 340 with tip 334.

Moreover, in the exemplary embodiment, tip portion 312 includes one of coolant supply conduit 370 and one coolant return conduit 374, wherein such conduits 370 and 374 include, but are not limited to, plenums, chambers, and channels (neither shown). In the exemplary embodiment, conduit 370 and conduit 374 are positioned on opposite sides of centerlines 316 and 318. Alternatively, a plurality of conduits 370 and 374 are used, wherein the plurality of conduits 370 are positioned adjacent to each other on one side of centerlines 316 and 318, while each of conduits 374 are positioned adjacent to each other on the opposite side of centerlines 316 and 318. Also, alternatively, conduits 370 and 374 are positioned in an alternating manner about centerlines 316 and 318. Further, alternatively, one or more bifurcated conduits may be used in place of conduits 370 or 374, wherein one portion of each such bifurcated conduit operates as a coolant return conduit. Moreover, alternatively, any configuration of conduits 370 and 374 may be positioned in any manner about centerlines 316 and 318 that enable operation of tip portion 312 as described herein.

Figure 8:
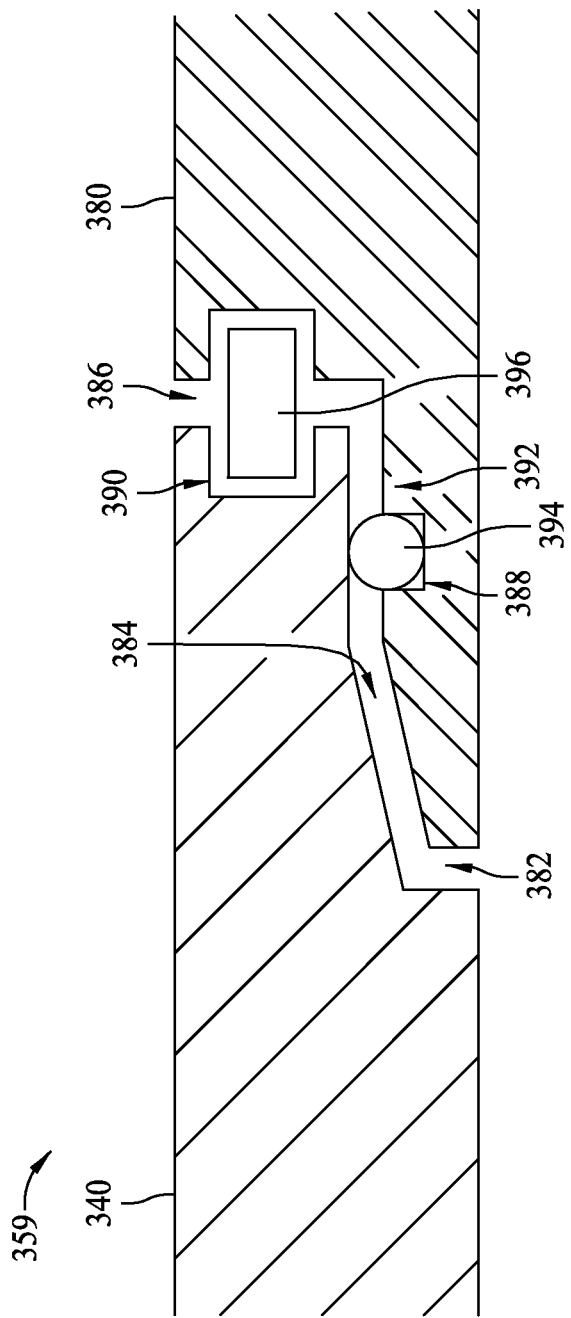
FIG. 8 is a schematic cross-sectional view of an exemplary seal assembly shown in FIGS. 6 and 7.

FIG. 8 is a schematic cross-sectional view of an exemplary seal assembly 359. In the exemplary embodiment, seal assemblies 357 and 358 are substantially similar. A mating end 380 of inner GOX nozzle 348 and inner GOX bayonet adapter 340 define a first longitudinal gap 382, a radial gap 384, and a second longitudinal gap 386, wherein gaps 382, 384, and 386 are in flow communication with each other. Moreover, gaps 382, 384, and 386 extend substantially radially within tip portion 312 (shown in FIGS. 6 and 7). Mating end 380 and bayonet adapter 340 also define a first seal gland 388 and a second seal gland 390, wherein both glands 388 and 390 extend substantially radially within tip portion 312. In the exemplary embodiment, seal assembly 359 includes a plurality of seals 392. More specifically, a first seal 394 is positioned within first seal gland 388 and a second seal 396 is positioned within second seal gland 390, wherein both seals 394 and 396 extend substantially radially within tip portion 312.

Also, in the exemplary embodiment, radial gap 384 is at least partially tapered. Such tapering facilitates mating up and alignment of bayonet adapter 340 and nozzle 348. Second seal 396, sometimes referred to as the main seal, facilitates manufacturing and assembly tolerances and variations of longitudinal gaps 382 and 386. First seal 382, cooperates with mating end 380, bayonet adapter 340, and radial gap 384 to facilitate alignment and mating of bayonet adapter 340 and nozzle 348, decreasing a potential for metal-to-metal contact thereof, facilitates dampening movement of bayonet adapter 340 and nozzle 348 as a result of mechanical vibration, and facilitates a reduction in foreign debris collection including, without limitation, fuel particles, within gaps 382, 384, and 386 that could potentially interfere with the operation of, or decrease an expected life of, main seal 396. Moreover, while in the exemplary embodiment, seal assembly 359 is configured and oriented as described above, alternatively, any configuration and orientation of seal assembly 359 that enables operation of seal assembly 359 and tip portion 312 as described herein is used.

Figure 9:
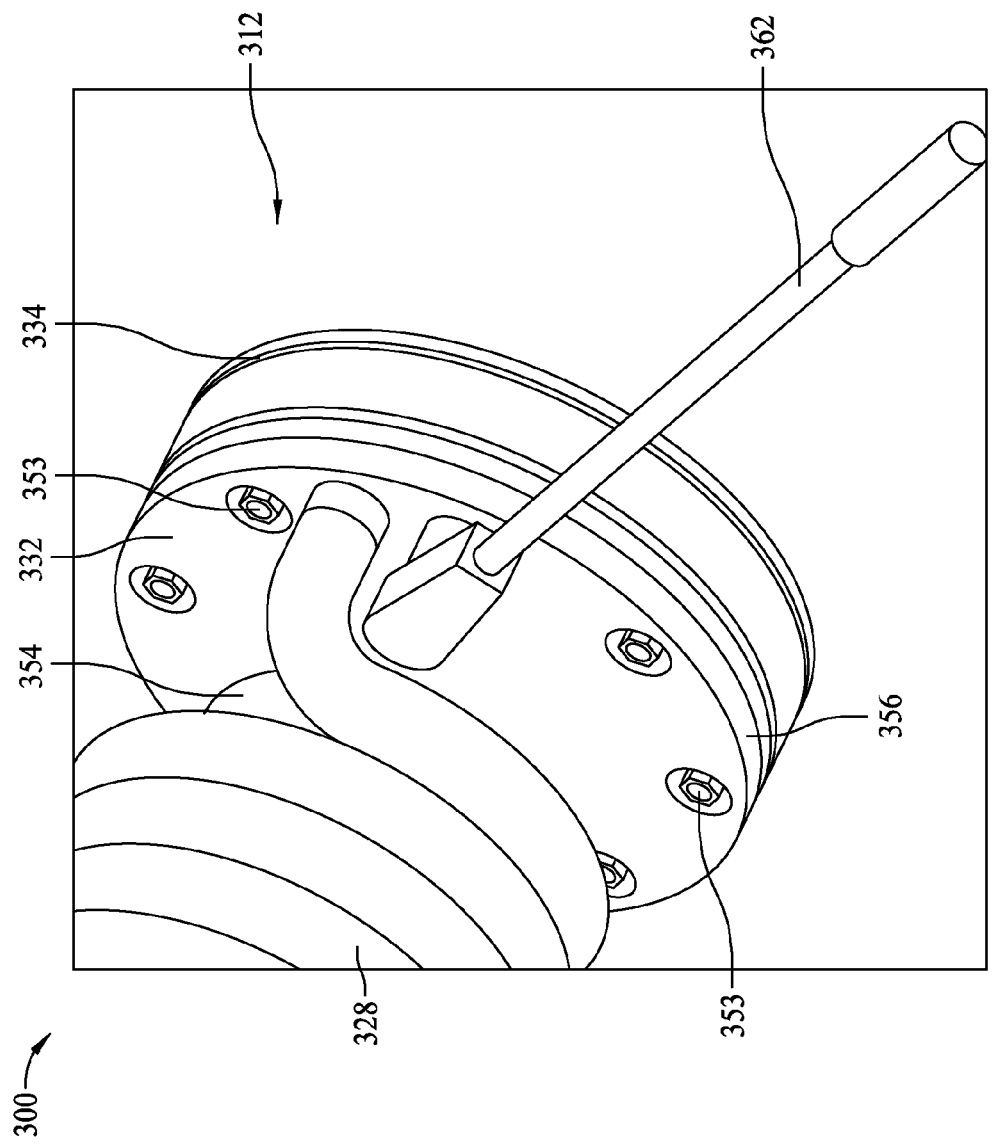
FIG. 9 is a schematic rear view of an exemplary adaptor portion that may be used with the tip portion shown in FIG. 5.

FIG. 9 is a schematic rear view of adaptor portion 332. In the exemplary embodiment, modular tip 334 is removably coupled to adapter portion 332 via retention hardware 353 using tools that include, but are not limited to, a torque wrench 362. Retention hardware 353 extends through adaptor portion 322 into modular tip portion 334, wherein hardware 353 engages both portions 332 and 334. As retention hardware 353 is tightened during assembly of tip portion 312 that includes coupling adapter portion 332 to modular tip 334, the shapes of the mating surfaces of adaptor portions 332, 338 and 340 and tip 322, seal assemblies 360 and 361 facilitate alignment and attainment of predetermined gaps (not shown) between portions 332, 338 and 340 with tip 334 to attain a predetermined gap (not shown) therebetween to further facilitate secure coupling of portions 332, 338 and 340 with tip 334. Also, specifically, seal assemblies 357, 358, and 359 facilitate providing a greater tolerance range within tip 334 to facilitate a greater tolerance for variances due to fabrication and assembly, and shifting and movement of components therein.

Therefore, in the exemplary embodiment, tip portion 312, including adapter portion 332 that is removably coupled to modular tip 334 via retention hardware 353, wherein modular tip 334 includes convergent and divergent nozzles 348, 350, and 352, facilitates assembly, disassembly, and field service of injection device 300. Moreover, modular tip 334 facilitates use of a fixed configuration therein regardless of thermal expansion effects of bayonet sections 321, 323, and 324 that may have any length and/or inherent manufacturing tolerances.

Figure 10:
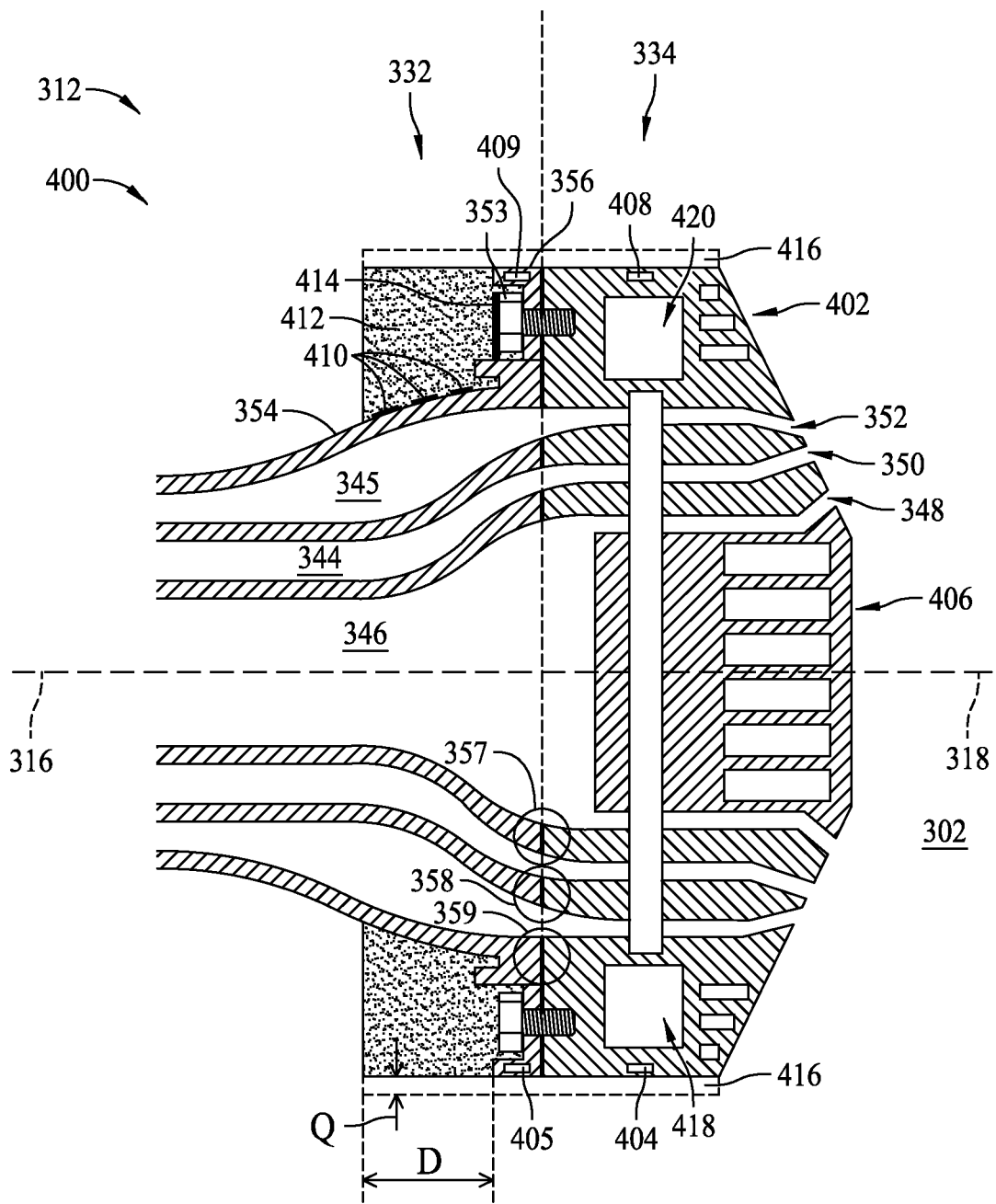
FIG. 10 is a schematic cross-sectional view of an exemplary coolant insulating scheme that may be used with the tip portion shown in FIG. 5.

FIG. 10 is a schematic cross-sectional view of an exemplary coolant insulating scheme 400 that may be used with tip portion 312. Coolant insulating scheme 400 includes plurality of coolant supply conduits 418 and coolant return conduits 420 (only one of each shown, and both also shown in FIG. 6), wherein such conduits 418 and 420 include, without limitation, plenums, chambers, and channels (neither shown). Supply conduits 418 include, and/or are at least coupled in flow communication with, at least one outer radial coolant inlet 404. Return conduits 420 include, and/or are at least coupled in flow communication with, at least one outer radial outlet 408, wherein outlet 408 is coupled in flow communication with inlet 404 via an outer radial channel (not shown). Inlet 404, outlet 408, and the associated channel are positioned within modular tip 334. Supply conduits 418 also include at least one inner radial coolant inlet 405. Return conduits 420 also include at least one inner radial outlet 409, wherein outlet 409 is coupled in flow communication with inlet 405 via an inner radial channel (not shown). Inlet 405, outlet 409, and the associated channel are positioned within adapter portion 332.

In the exemplary embodiment, inlets 404 and 405, outlets 408 and 409, and the associated cooling channels defined therebetween are configured such that at least a portion of heat resulting from exothermic reactions within gasification reactor cavity 302 is absorbed within the coolant flowing therethrough, thereby at least partially removing heat from external surface 356 and at least partially insulating from the aforementioned heat nearby components positioned radially inward therefrom, including, without limitation, retention hardware 353.

Also, in the exemplary embodiment, in addition to surface and localized heat removal and localized insulation, coolant insulating scheme 400 facilitates shielding radially inner components of tip portion 312 from heat generated within cavity 302. Moreover, in the exemplary embodiment, coolant supply conduits 418 and coolant return conduits 420 facilitate insulating axially outer portions of modular tip 334 that include, without limitation, a plurality of radially outer face channels 402 and a plurality of radially inner face channels 406.

In the exemplary embodiment, scheme 400 further includes at least one layer of insulation 412, or more specifically, at least one insulation insert 412 that is coupled to an axially rear portion of adaptor portion 332, specifically, over retention hardware 353 and adjacent to at least a portion of external surface 354. In the exemplary embodiment, such insulation insert 412 is formed of any known refractory material suitable for a gasification environment including, but not limited to, a high temperature chromina-alumina castable material. Alternatively, such insulation insert 412 is formed of any known refractory material including, but not limited to, shaped pre-cast ceramic fixtures and ceramic matrix composite (CMC).

Further, in the exemplary embodiment, at least a portion of at least one insulation insert 412 is formed as a pair of substantially semi-annular pre-fabricated inserts 412 that radially extend between surfaces 354 and 356, and circumscribe tip portion 312 about surface 354 and fastener 353. The pair of semi-annular inserts 366 are coupled to each other in any manner that enables operation of scheme 400 as described herein. Alternatively, any number of inserts 412 in any shape that enables operation of scheme 400 as described herein is used. Further, in the exemplary embodiment, inserts 412 do not have any coatings, however, alternative embodiments may have any refractory coating that enables operation of scheme 400 as described herein. Also, in the exemplary embodiment, inserts 412 do not extend axially along surface 356. Alternatively, inserts 412 include an insert extension 416 that extends axially along surface 356 and has any thickness and length dimensions that enable operation of scheme 400 as described herein. Moreover, insulation insert 412 extends axially a predetermined distance D from fastener 353 along surface 354. In the exemplary embodiment, distance D is within a range of approximately 5.08 centimeters (CM) (2 inches (in.)) to 7.62 CM (3 in.), preferably distance D is 6.6 cm (2.6 in.). Alternatively, distance D has any value that enables operation of scheme 400 as described herein.

In the exemplary embodiment, insulation inserts 412 are at least partially secured to surface 354 using retention hardware 410 such as, but not limited to, metallic refractory anchors that are coupled to, for example, but not limited to, welded to surface 354 prior to coupling insulation inserts 412. Alternatively, retention hardware 410 includes, but is not limited to, integrally formed extensions such as anchor pins, fins, or ridges that are used to help secure insulation inserts 412 to surface 354. In addition, the securing of inserts 412 to surface 354 may be facilitated by means that may include but are not limited to the use of refractory cement, mortar or a castable refractory overlay. In another embodiment, a thin layer of barrier material 414, such as refractory cloth or paper, is placed over the top of retention hardware 353 before positioning insulation inserts 412 over surface 354 and the top of retention hardware 353. Barrier material 414 facilitates preventing accumulation of insulation inserts 412 about the head portion of retention hardware 353 when insulation inserts 412 is, for example, a castable refractory material, thereby facilitating ease of disassembly and maintenance of injector tip 312. To ensure barrier material 414 does not negatively affect the insulation capability of insulation inserts 412, an outer perimeter of barrier material 414 preferably terminates a predetermined distance Q from surface 356 and a thickness of barrier material 414 is predetermined to not decrease the effectiveness of insulation inserts 412.

In operation, reactants flow through channels 344, 345, and 346 into gasification cavity 302, wherein exothermic reactions and resultant heat are generated. Coolant flows into tip portion 312 via coolant supply manifold 326 (shown in FIGS. 3 and 6) and subsequently into conduits 370, which include inlets 404 and 405. Coolant flows through radially and axially outboard portions of tip portion 312 via associated cooling channels into coolant return manifold 327 (shown in FIGS. 3 and 6) via conduits 374, which includes outlets 408 and 409. Channeling coolant through inlets 404 and 405, outlets 408 and 409, and cooling channels therebetween facilitates insulating radially and axially inner portions of tip portion 312 from heat generated by exothermic reactions in cavity 302. Moreover, insulation inserts 412 further insulate retention hardware 353 and at least a portion of external surface 354 from such heat, thereby facilitating mitigation of undesirable differential thermal expansion effects or heat-related damage to hardware 353 and surface 354.

Figure 11:
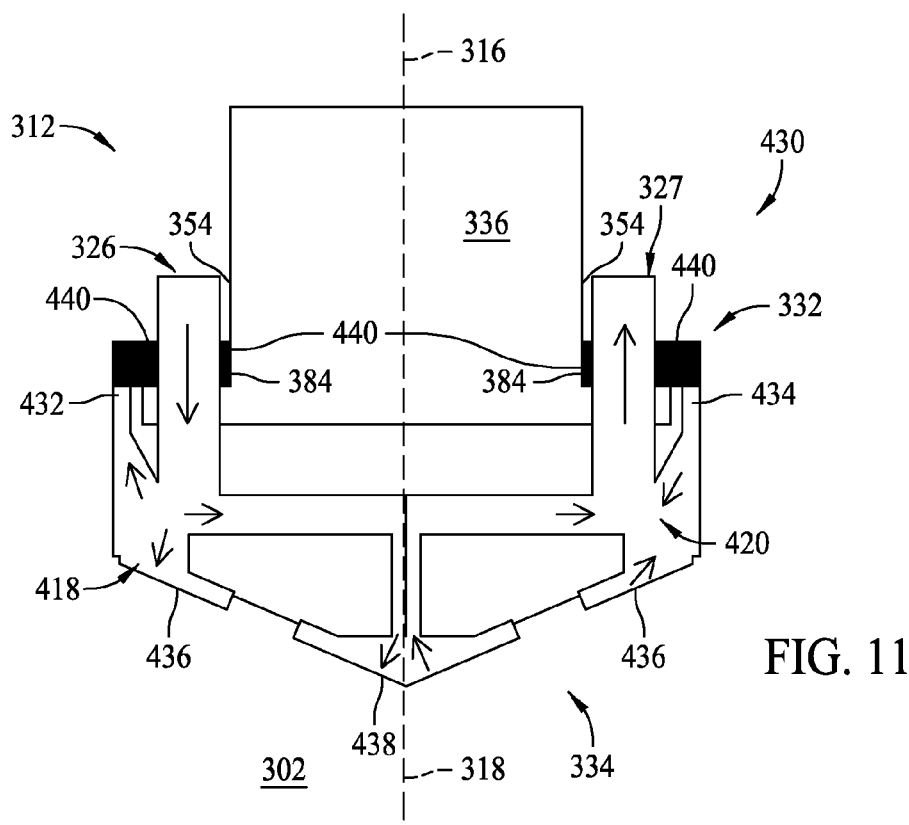
FIG. 11 is a schematic cross-sectional view of another exemplary coolant insulating scheme that may be used with the tip portion shown in FIG. 5.
Figure 12:
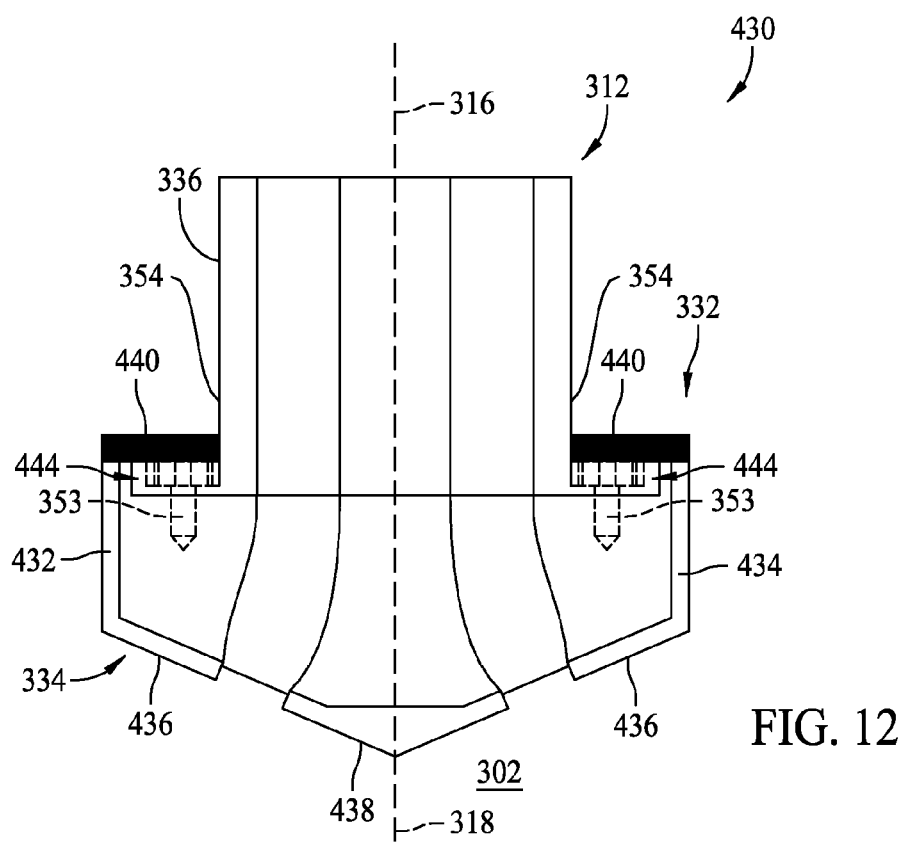
FIG. 12 is another schematic cross-sectional view of the coolant insulating scheme that may be used with the tip portion shown in FIG. 11.

FIG. 11 is a schematic cross-sectional view of another exemplary coolant insulating scheme 430 that may be used with the tip portion 312. FIG. 12 is another schematic cross-sectional view of exemplary coolant insulating scheme 430 that may be used with tip portion 312, wherein tip portion 312 is rotated approximately 90° axially about injection device centerline 316. Scheme 430 includes plurality of coolant supply conduits 418, wherein such conduits include, but are not limited to, plenums, chambers, and channels (neither shown). Supply conduits 418 include a radially outermost coolant supply channel 432 that is an integral part of modular tip portion 334 and extends axially over a portion of adapter portion 332. Channel 432 is configured such that at least a portion of heat resulting from exothermic reactions within gasification reactor cavity 302 is absorbed within the coolant flowing within channel 432, thereby insulating radially inward components of tip portion 312 from the aforementioned heat.

Similarly, scheme 430 also includes plurality of coolant return conduits 420, which includes a radially outermost coolant return channel 434 that is an integral part of modular tip 334 and extends axially over a portion of adapter portion 332. In the exemplary embodiment, return channel 434 is coupled in flow communication with supply channel 432 such that channels 432 and 434 cooperate to form a radially outermost heat insulation shield that is configured to insulate radially inward components of tip portion 312 from the heat generated within cavity 302. Plurality of coolant supply conduits 418 and coolant return conduits 420 also facilitate insulating axially outer portions of modular tip 334 that include a radially outer face portion 436 and a radially inner face portion 438.

Also, in the exemplary embodiment, scheme 430 further includes at least one layer of insulation 440, or more specifically, at least one insulation insert 440 that is coupled to an axially rear portion of adaptor portion 332, specifically, over at least a portion of external surface 354 and circumferentially about manifolds 326 and 327. In the exemplary embodiment, such insulation insert 440 is formed of any known refractory material suitable for a gasification environment including, but not limited to, a high temperature chromina-alumina castable material. Alternatively, such insulation insert 440 is formed of any known refractory material including, but not limited to, shaped pre-cast ceramic fixtures, ceramic matrix composite (CMC), and mortar.

Further, in the exemplary embodiment, insulation insert 440 is formed as a pair of pre-fabricated inserts 440 that radially extend between surfaces 354 and channels 432 and 434. Alternatively, any number of inserts 440 in any shape that enables operation of scheme 430 as described herein is used. Further, in the exemplary embodiment, inserts 440 do not have any coatings, however, alternative embodiments may have any refractory coating that enables operation of scheme 430 as described herein.

Moreover, in the exemplary embodiment, insulation inserts 440 are at least partially secured to surface 354 using retention hardware 442 such as, but not limited to, metallic refractory anchors that are coupled to, for example, but not limited to, welded to surface 354 prior to coupling insulation inserts 440. Alternatively, retention hardware 442 includes, but is not limited to, integrally formed extensions such as anchor pins, fins, or ridges that are used to help secure insulation inserts 440 to surface 354. Additionally, the fastening of inserts 440 may be assisted by means that include, without limitation, mortar and refractory castable overlay.

Also, in the exemplary embodiment, fasteners 353 and modular tip 312 define a void 385 that may be filled with castable material or mortar.

Figure 13:
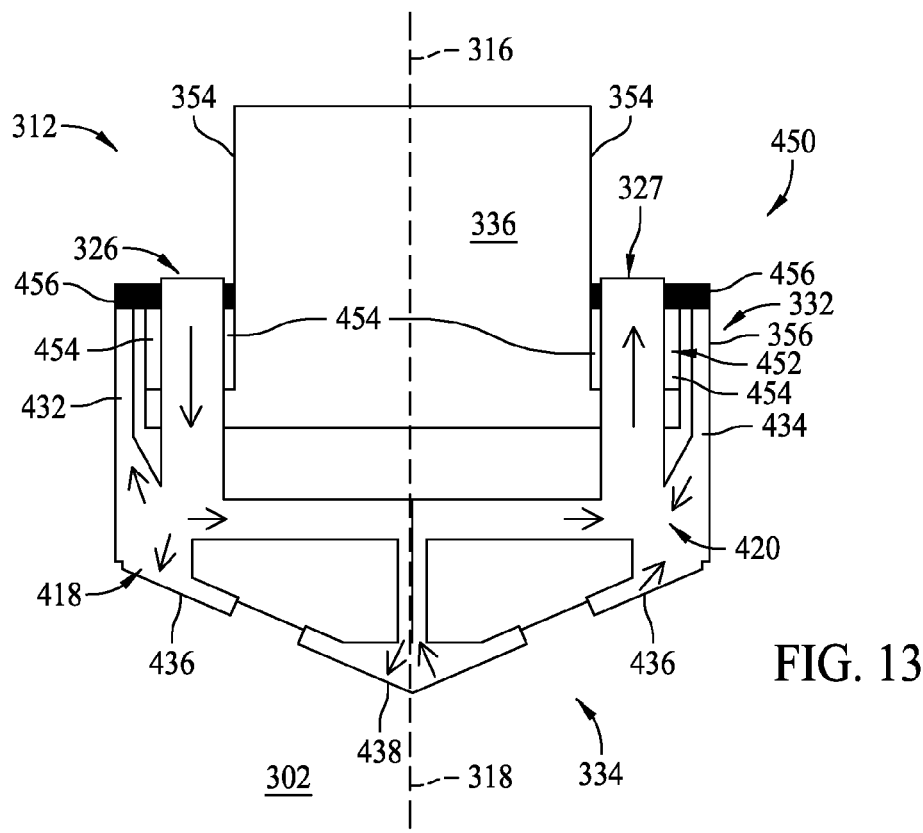
FIG. 13 is a schematic cross-sectional view of another exemplary coolant insulating scheme that may be used with the tip portion shown in FIG. 5.
Figure 14:
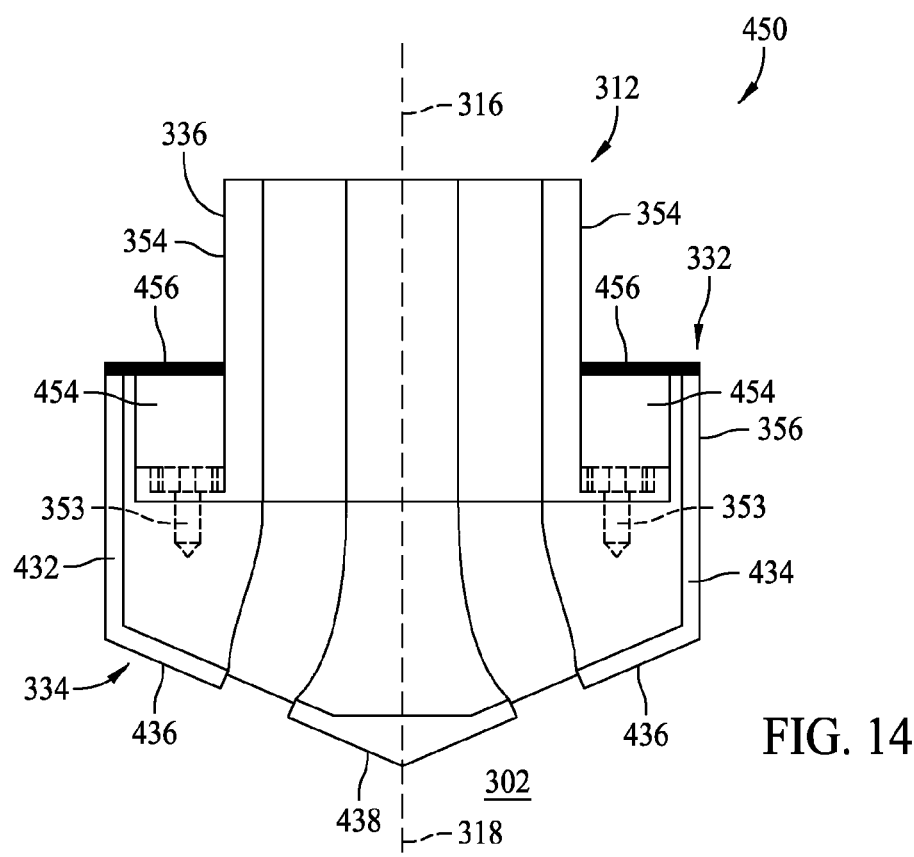
FIG. 14 is another schematic cross-sectional view of the coolant insulating scheme that may be used with the tip portion shown in FIG. 13.

FIG. 13 is a schematic cross-sectional view of another exemplary coolant insulating scheme 450 that may be used with tip portion 312. FIG. 14 is another schematic cross-sectional view of coolant insulating scheme 4506 that may be used with tip portion 312. In this exemplary embodiment, surface 356 of modular tip portion 334 axially extends beyond the top of fasteners 353. Surface 356, surface 354, and fastener 353 define a receptacle-type channel 452. A plurality of partially annular refractory inserts 454 are positioned in channel 452, thereby facilitating insulating fasteners 353 and a portion of surface 354 from high temperatures. In addition, insulating material 456 may be applied over the top of inserts 454, thereby facilitating retention of inserts 454 in place while also providing additional thermal protection of fasteners 353 and a portion of external surface 354. Furthermore, insulating material 456 may also extend axially along surface 356. In the exemplary embodiment, channels 418 and 420 are extended to cool the extended axially lengths of surface 356. Alternatively, a substantially annular extension is coupled to surface 356 to extend surface 356 axially either with or without a corresponding extension of channels 418 and 420.

Figure 15:
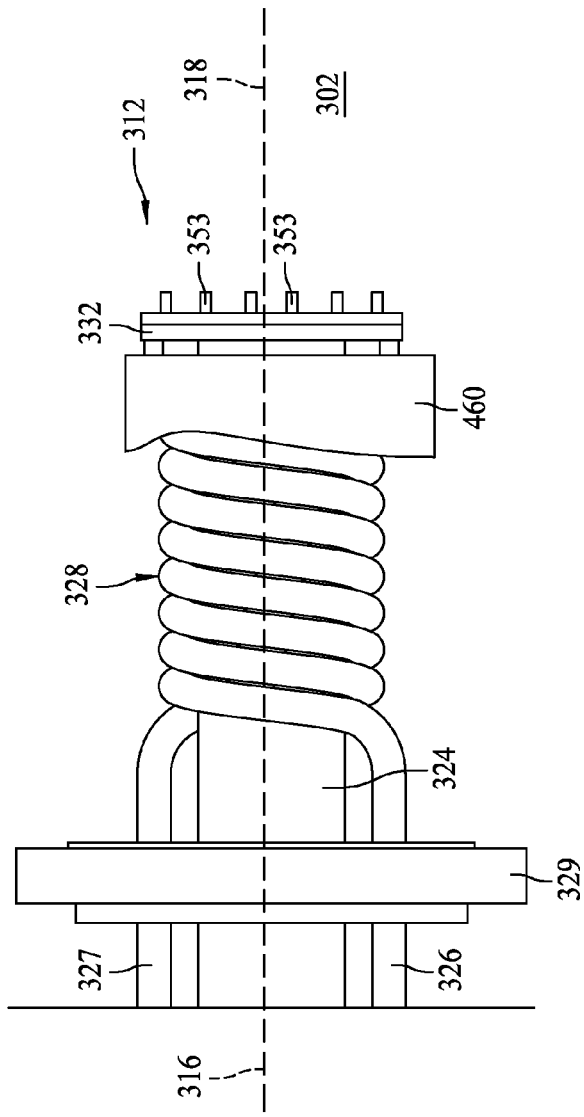
FIG. 15 is a schematic view of an exemplary extended refractory cap system that may be used with the tip portion shown in FIG. 5.
Figure 16:
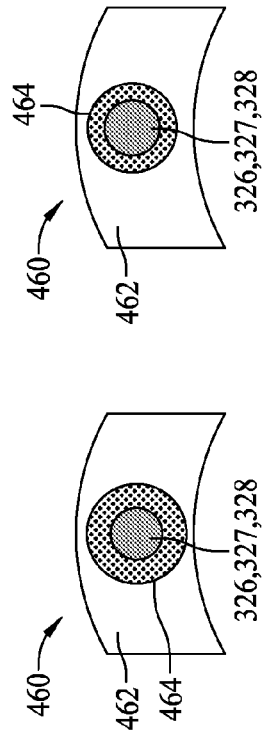
FIG. 16 is a schematic view of a portion of the extended refractory cap system shown in FIG. 15.

FIG. 15 is a schematic view of an exemplary extended refractory cap system 460 that may be used with tip portion 312. FIG. 16 is a schematic view of a portion of extended refractory cap system 460. In the exemplary embodiment, system 460 extends from adaptor portion 332 to flange 329, thereby extending over substantially all of coils 328 and that portion of manifolds 326 and 327 extending into cavity 302. Alternatively, system 460 extends for any distance between flange 329 and adaptor portion 332.

In the exemplary embodiment, system 460 includes at least one layer of castable refractory 462. Alternatively, system 460 includes any materials that enable operation of system 460 as described herein including, but not limited to, any known refractory material, high-temperature fiber blanket, ceramic blanket, shaped pre-cast ceramic fixtures, and CMC.

System 460 also includes at least one layer of high-temperature fiber blanket 464 coupled to and extending under at least a portion of castable refractory 462. Alternatively, blanket 464 is manufactured from any material that facilitates operation of system 460 as described herein, including, but not limited to any known refractory material, ceramic blanket, shaped pre-cast ceramic fixtures, and CMC. FIG. 16 illustrates portions of system 460 extending over portions of manifolds 326 and 327 extending into cavity 302 from flange 329, and portions of coils 328 coupled to adaptor portion 332. Greater thicknesses of blanket 464 facilitate tolerance for piping movement and vibration in the vicinity of flange 329. Thinner portions of blanket 464 facilitate low tolerance and snugness in the vicinity of adaptor portion 332.

In some embodiments, securing blanket 464 to tip portion is performed by any method that enables operation of system 460 as described herein including, but not limited to, metallic band-its, and tucking a portion of blanket 464 under castable refractory 462 as described above.

Figure 17:
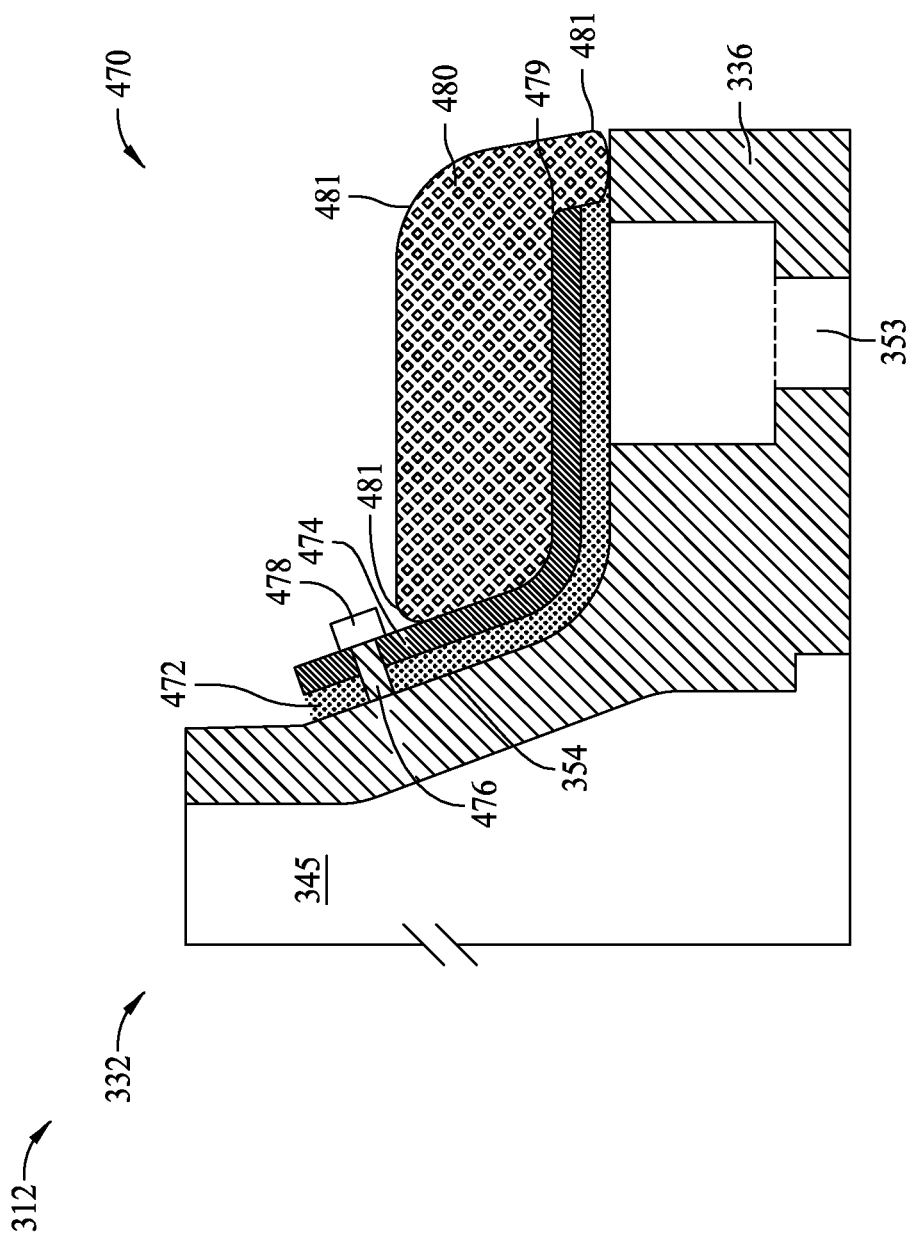
FIG. 17 is a schematic view of an exemplary replaceable insulating cap system that may be used with the tip portion shown in FIG. 5.

FIG. 17 is a schematic view of an exemplary replaceable insulating cap system 470 that may be used with tip portion 312. In the exemplary embodiment, system 470 extends substantially annularly about outer GOX bayonet adapter 336. Also, in the exemplary embodiment, system 470 includes at least one ceramic blanket 472 coupled to at least a portion of outer GOX bayonet adapter 336 and retention hardware 353. Alternatively, system 470 uses any material that facilitates operation of system 470 as described herein including, but not limited to, high-temperature fiber blanket, shaped pre-cast ceramic fixtures, any known refractory, and CMC.

Also, in the exemplary embodiment, system 470 includes a support plate 474 coupled to blanket 472 and bayonet adapter 336 via a plurality of studs 476 and lock plates 478. Lock plates 478 are tack welded to studs 476. Alternatively, any coupling method that facilitates operation of system 470 as described herein is used including, but not limited to, welding, and/or brazing. Support plate 474 is formed from materials that include, but are not limited to, ceramic blanket, high-temperature fiber blanket, shaped pre-cast ceramic fixtures, any known refractory, and CMC. Moreover, support plate 474 includes at least one tapered corner 479 that facilitates mitigating thermal and mechanical stresses within plate 474.

Further, in the exemplary embodiment, system 470 includes at least one insulating cap 480 coupled to at least a portion of support plate 474. Cap 480 is formed from two or three overlapping sections (not shown) of materials that include, but are not limited to, ceramic blanket, high-temperature fiber blanket, shaped pre-cast ceramic fixtures, any known refractory, and ceramic matrix composite (CMC). Selection of the materials for cap 480 may be based on selection of the materials for plates 474. For example, use of CMC to form cap 480 facilitates consideration of CMC to form plate 474 from CMC. Moreover, cap 480 includes a plurality of tapered corners 481 that facilitates mitigating thermal and mechanical stresses within cap 480.

Cap system 470 mitigates a potential for overheating of retention hardware 353 and surface 354 and a loss of preloading between adaptor portion 332, tip portion 334 and bayonet adapter 336.

Figure 18:
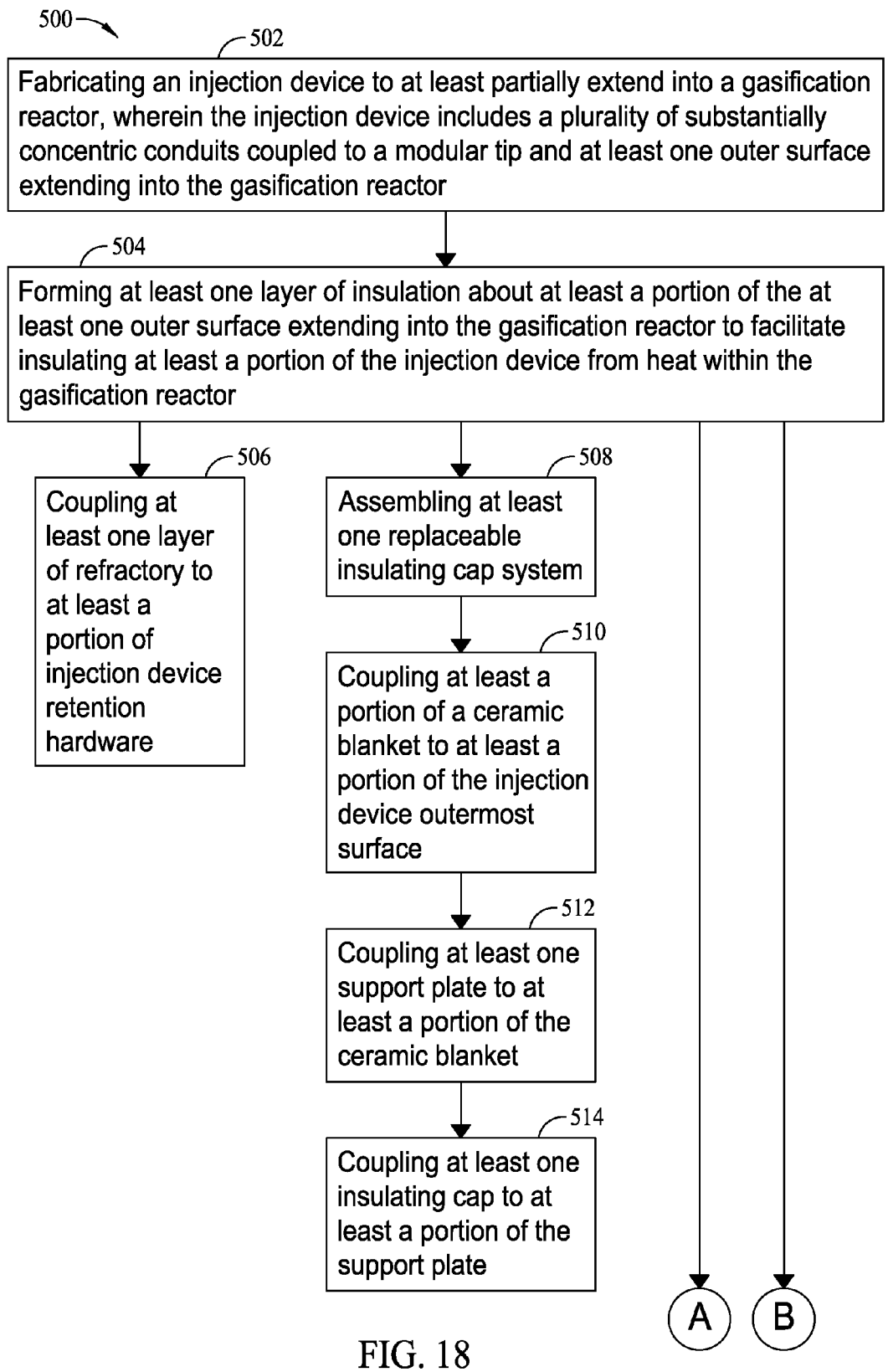
FIG. 18 is a flow chart of an exemplary method of assembling the gasification reactor shown in FIG. 2.
Figure 19:
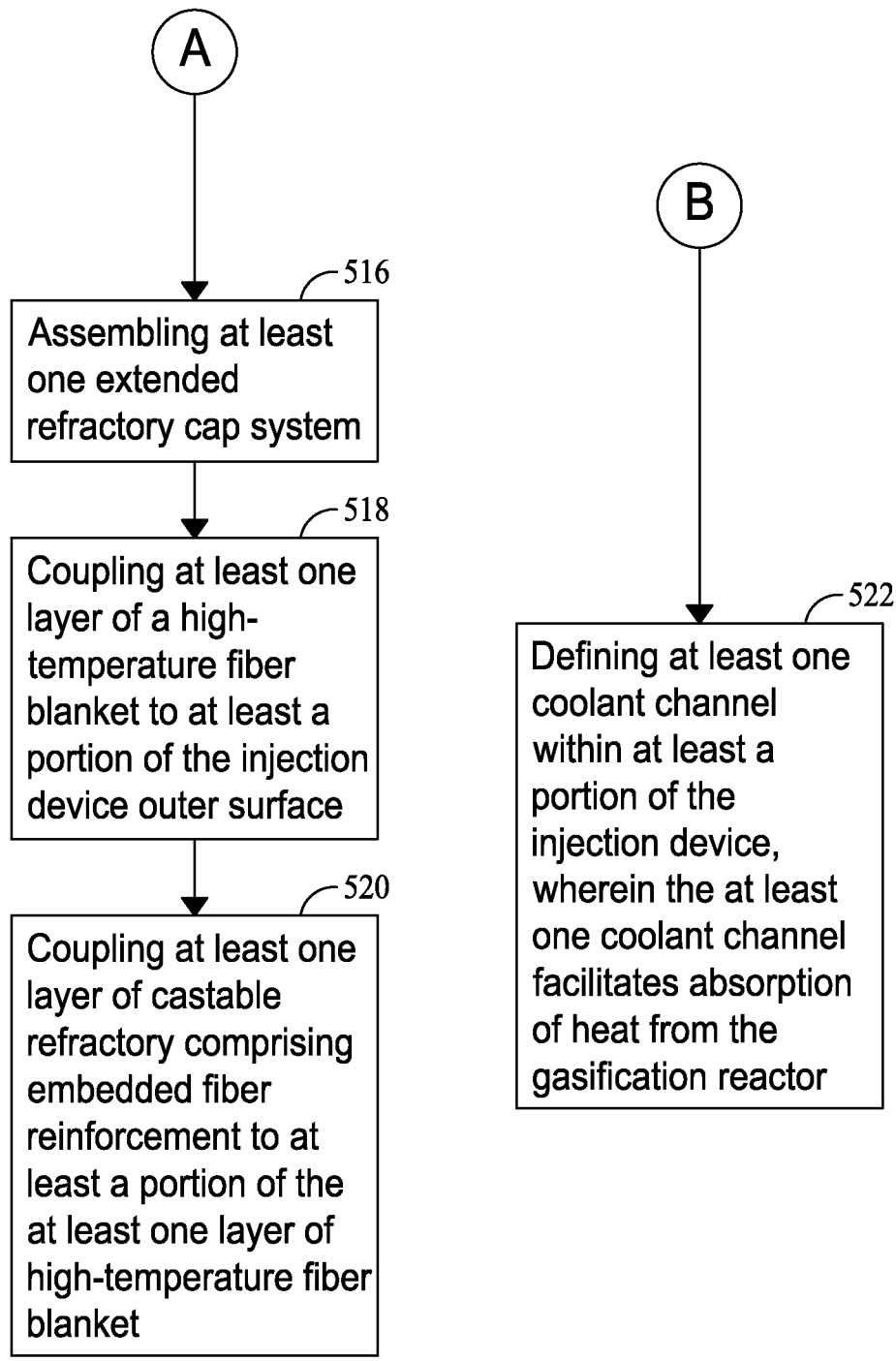
FIG. 19 is a continuation of the flow chart shown in FIG. 18.

FIG. 18 is a flow chart of an exemplary method 500 of assembling gasification reactor 208 (shown in FIG. 2). FIG. 19 is a continuation of the flow chart shown in FIG. 18. In the exemplary embodiment, injection device 300 (shown in FIGS. 2, 3, and 9) is at least partially extended 502 into gasification reactor 208, wherein injection device 300 includes a plurality of substantially concentric conduits, that is, bayonet sections 321/323/324 (all shown in FIG. 3) and/or adapters 336/338/340 (all shown in FIGS. 4 and 6), coupled to modular tip 334 (shown in FIGS. 4, 6, 7, 9, 10, 12, 13, and 14), at least one outer surface 354 (shown ion FIGS. 4, 6, 7, 9-15, and 17) that is extending into gasification reactor 208. At least one layer of insulation 440 (shown in FIG. 11), 462 (shown in FIGS. 16 and 17), 464 (shown in FIGS. 16 and 17), and 472 (shown in FIG. 17) is formed 504 about at least a portion of outer surface 354 extending into gasification reactor 208 to facilitate insulating at least a portion of injection device 300 from heat within gasification reactor 208. Such at least one layer of insulation 440, 462, 464, and 472 includes at least one of a high-temperature fiber blanket, a ceramic blanket, a shaped pre-cast ceramic fixture, a refractory, and a ceramic matrix composite (CMC). Also, in the exemplary embodiment, at least one layer of refractory 440 is coupled 506 to at least a portion of retention hardware 353.

In at least one alternative embodiment, at least one replaceable insulating cap system 470 (shown in FIG. 17) is assembled 508. At least a portion of a ceramic blanket 472 (shown in FIG. 17) is coupled 510 to at least a portion of injection device outermost surface 354. Also, at least one support plate 474 (shown in FIG. 17) is coupled 512 to at least a portion of ceramic blanket 472. Further, at least one insulating cap 480 (shown in FIG. 17) is coupled 514 to at least a portion of support plate 474.

In at least one other alternative embodiment, at least one extended refractory cap system 460 (shown in FIGS. 15 and 16) is assembled 516. At least one layer of high-temperature fiber blanket 464 (shown in FIGS. 15 and 16) is coupled 518 to at least a portion of outer surface 354. Also, at least one layer of castable refractory 462 (shown in FIGS. 15 and 16), including embedded fiber reinforcement, is coupled 520 to at least a portion of high-temperature fiber blanket 464.

Also, in the exemplary embodiment, at least one coolant channel 418/420 (shown in FIGS. 10, 11, and 13) is defined 522 within at least a portion of the injection device 300, wherein at least one coolant channel 418/420 facilitates absorption of heat from gasification reactor 208.

The method and apparatus for assembling gasification reactor injection devices, and more specifically, the method and apparatus for insulating heat from external surfaces of gasification systems' injection devices as described herein facilitates operation of a gasification facility. Such a facility includes a gasification system integrated with a combined-cycle power generation plants, that is, integrated gasification combined-cycle (IGCC) power generation plants, and, specifically, syngas production systems, and more specifically, gasification reactors. Moreover, channeling coolant through fluid cooling apparatus facilitates insulating radially and axially inner portions injection devices as described herein. Further, using the insulating materials as described herein protects external surfaces, retention hardware, and internal components of the disclosed injection devices from exposure to hot syngas and the associated elevated temperatures.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A method of assembling an injection device having an axial centerline for use in a reactor injector feed assembly, said method comprising:
    extending an injection device at least partially into a gasification reactor, wherein the injection device includes a plurality of substantially concentric conduits coupled to a modular tip and at least one outer surface, the modular tip includes a plurality of substantially annular nozzles defined therein, oriented such that at least two of the substantially concentric conduits are coupled in fluid communication with a respective at least two of the substantially annular nozzles, wherein the plurality of substantially annular nozzles include at least one nozzle orientated divergently with respect to the axial centerline and at least one nozzle orientated convergently with respect to the axial centerline, the at least one divergently orientated nozzle and the at least one convergently orientated nozzle are configured to form a first recirculation zone and a second recirculation zone within the gasification reactor; and
    forming at least one layer of insulation about at least a portion of the at least one outer surface to facilitate insulating at least a portion of the injection device from heat within the gasification reactor.

2. A method according to claim 1 wherein forming at least one layer of insulation comprises forming at least one of:
    at least one layer of high-temperature fiber blanket;
    at least one layer of ceramic blanket;
    at least one shaped pre-cast ceramic fixture;
    at least one layer of refractory; and
    at least one layer of ceramic matrix composite (CMC).

3. A method in accordance with claim 2 further comprising defining at least one coolant channel within at least a portion of the injection device, wherein the at least one coolant channel facilitates absorption of heat from the gasification reactor.

4. A method in accordance with claim 1 wherein forming at least one layer of insulation comprises coupling at least one layer of refractory to at least a portion of injection device retention hardware.

5. A method in accordance with claim 1 wherein forming at least one layer of insulation comprises assembling at least one replaceable insulating cap system comprising:
    coupling at least a portion of a ceramic blanket to at least a portion of the injection device outermost surface;
    coupling at least one support plate to at least a portion of the ceramic blanket; and
    coupling at least one insulating cap to at least a portion of the support plate.

6. A method in accordance with claim 1 wherein forming at least one layer of insulation comprises assembling at least one extended refractory cap system comprising:
    coupling at least one layer of high-temperature fiber blanket to at least a portion of the injection device outer surface; and coupling at least one layer of castable refractory comprising embedded fiber reinforcement to at least a portion of the at least one layer of high-temperature fiber blanket.

7. An injection device having an axial centerline for use in a reactor injector feed assembly comprising:
  a plurality of substantially concentric conduits coupled to a modular tip comprising a plurality of substantially annular nozzles, oriented such that at least two of the substantially concentric conduits are coupled in fluid communication with a respective at least two of the substantially annular nozzles, said plurality of substantially annular nozzles comprise at least one nozzle orientated divergently with respect to said axial centerline and at least one nozzle orientated convergently with respect to said axial centerline, said at least one divergently orientated nozzle and said at least one convergently orientated nozzle are configured to form a first recirculation zone and a second recirculation zone within a gasification reactor;
  at least one outer surface extending into the gasification reactor such that said at least one outer surface is exposed to a source of heat generated within the gasification reactor; and
  at least one layer of insulation formed about at least a portion of said at least one outer surface to facilitate heat insulation from the source of heat generated within the gasification reactor.

8. An injection device in accordance with claim 7 wherein said at least one layer of insulation is formed from at least one of:
  a high-temperature fiber blanket;
  a ceramic blanket;
  a shaped pre-cast ceramic fixture;
  refractory; and
  ceramic matrix composite (CMC).

9. An injection device in accordance with claim 7 further comprising at least one coolant channel defined within at least a portion of said injection device, wherein said at least one coolant channel facilitates absorption of heat from the gasification reactor.

10. An injection device in accordance with claim 9, wherein said at least one coolant channel extends about at least a portion of said modular tip.

11. An injection device in accordance with claim 7 further comprising retention hardware, wherein said at least one layer of insulation comprises at least one layer of refractory coupled to at least a portion of said retention hardware.

12. An injection device in accordance with claim 11 wherein said at least one layer of refractory comprises at least one refractory insert.

13. An injection device in accordance with claim 7 wherein said at least one layer of insulation comprises at least one replaceable insulating cap system comprising:
  at least one ceramic blanket;
  at least one support plate coupled to at least a portion of said at least one ceramic blanket by at least one fastening mechanism; and
  at least one insulating cap coupled to at least a portion of said at least one support plate.

14. An injection device in accordance with claim 7 wherein said at least one layer of insulation comprises at least one extended refractory cap system comprising:
  at least one layer of high-temperature fiber blanket; and
  at least one layer of castable refractory comprising embedded fiber reinforcement coupled to at least a portion of said at least one layer of high-temperature fiber blanket.

15. A gasification facility comprising:
  at least one carbonaceous reactant source;
  at least one oxygenated fluid reactant source;
  at least one gasification reactor comprising at least one injection device having an axial centerline coupled in flow communication with said at least one carbonaceous reactant source and said at least one oxygenated fluid reactant source, said at least one injection device comprising:
  a plurality of substantially concentric conduits coupled to a modular tip comprising a plurality of substantially annular nozzles, oriented such that at least two of the substantially concentric conduits are coupled in fluid communication with a respective at least two of the substantially annular nozzles, said plurality of substantially annular nozzles comprise at least one nozzle orientated divergently with respect to said axial centerline and at least one nozzle orientated convergently with respect to said axial centerline, said at least one divergently orientated nozzle and said at least one convergently orientated nozzle are configured to form a first recirculation zone and a second recirculation zone within the gasification reactor;
  at least one outer surface extending into said at least one gasification reactor such that said at least one outer surface is exposed to a source of heat generated within said at least one gasification reactor; and
  at least one layer of insulation formed about at least a portion of said at least one outer surface to facilitate heat insulation from the source of heat generated within said at least one gasification reactor.

16. A gasification facility in accordance with claim 15 further comprising at least one coolant channel defined within at least a portion of said injection device, wherein said at least one coolant channel facilitates absorption of heat from said at least one gasification reactor.

17. A gasification facility in accordance with claim 15, wherein said at least one coolant channel extends about at least a portion of said modular tip.

18. A gasification facility in accordance with claim 15 further comprising retention hardware, wherein said at least one layer of insulation comprises at least one layer of refractory coupled to at least a portion of said retention hardware.

19. A gasification facility in accordance with claim 15 wherein said at least one layer of insulation comprises at least one replaceable insulating cap system comprising:
  at least one ceramic blanket;
  at least one support plate coupled to at least a portion of said at least one ceramic blanket by at least one fastening mechanism; and
  at least one insulating cap coupled to at least a portion of said at least one support plate.

20. A gasification facility in accordance with claim 15 wherein said at least one layer of insulation comprises at least one extended refractory cap system comprising:
  at least one layer of high-temperature fiber blanket; and
  at least one layer of castable refractory comprising embedded fiber reinforcement coupled to at least a portion of said at least one layer of high-temperature fiber blanket.

* * * * *